(12) United States Patent
Hayashi et al.

(10) Patent No.: US 6,239,909 B1
(45) Date of Patent: May 29, 2001

(54) IMAGE-FORMING METHOD AND IMAGE-FORMING APPARATUS

(75) Inventors: Shinichi Hayashi, Toshima-ku; Yasuhiro Kamihara, Hino, both of (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 09/219,605

(22) Filed: Dec. 23, 1998

(30) Foreign Application Priority Data

Dec. 25, 1997 (JP) .................................................... 9-356801
Apr. 22, 1998 (JP) .................................................. 10-111644

(51) Int. Cl.[7] ............................ G02B 5/18; G02B 21/00; G02B 27/58
(52) U.S. Cl. .......................... 359/569; 359/566; 359/558; 359/577
(58) Field of Search ................................... 359/569, 566, 359/558, 369, 577

(56) References Cited

U.S. PATENT DOCUMENTS 4,973,111 * 11/1990 Haacke et al. ......................... 324/309
5,748,507 *  5/1998 Abatzoglou et al. ................. 364/572

OTHER PUBLICATIONS

Mendlovic et al., "One–Dimensional Superresolution Optical System for Temporarily Restricted Objects", Applied Optics, vol. 36, No. 11, Apr. 10, 1997, pp. 2353–2359.

Lukosz, "Optical Systems with Resolving Powers Exceeding the Classical Limit. II", Journal of the Optical Society of America, vol. 57, No. 7, Jul. 1967, pp. 932–941.

* cited by examiner

Primary Examiner—Jon Henry
(74) Attorney, Agent, or Firm—Pillsbury Winthrop LLP

(57) ABSTRACT

A microscopy and apparatus capable of obtaining superresolution, and a fringe projection light-cut microscopy and apparatus capable of obtaining a natural light-cut image and enabling real-time observation. At the component separating step, a plurality of modulated images of an observation object (O) are formed by subjecting the observation object (O) to spatial modulation including a plurality of modulation components while varying the component ratios of the modulation components by moving a diffraction grating (21), which modulates the observation object (O), to a plurality of different positions. The modulated images are detected with an image pickup device (22). Modulated image components corresponding to the modulation components are separated from the number of modulated images that is not less than the number of the modulation components by using linear computation. At the component demodulating step, at least one of the separated modulated image components is demodulated.

20 Claims, 19 Drawing Sheets

Fourier component of two-dimensional diffraction grating

Range of transfer function of illuminating lens

IMAGE-FORMING METHOD AND IMAGE-FORMING APPARATUS

BACKGROUND OF THE INVENTION

1. Field of the Invention

The present invention relates to an image-forming method and an image-forming apparatus. More particularly, the present invention relates to an image-forming method that uses a microscope. The present invention also relates to an image-forming apparatus using a microscope.

2. Description of Related Art

In image formation by an image-forming optical system, e.g. an optical microscope, a transfer function unique to each particular image-forming optical system exists as detailed in J. W. Goodman, "Introduction to Fourier Optics", McGraw-Hill (1968) by way of example. The characteristics of an object image formed by an image-forming optical system is limited by the transfer function. More specifically, among Fourier components (spatial frequency components) of an optical image to be transferred by an image-forming optical system, only those in a specific spatial frequency region determined by the transfer function of the image-forming optical system are transferred, and the remaining spatial frequency components are cut off.

For example, in an ordinary optical microscope, a spatial frequency $f_{cutoff}$ exists, which is determined by the numerical aperture (NA) of the objective and known as "cutoff frequency":

$$f_{cutoff}=2NA/\lambda \qquad (1)$$

(where $\lambda$ is the wavelength of light)

Among the Fourier components of an input optical image, spatial frequency components higher than the cutoff frequency are cut off and hence cannot be reflected in image formation.

As shown in FIG. 12 in the accompanying drawings, the numerical aperture of an objective 1 is determined by multiplying together the sine function of ½ of the apex angle of the cone of light 2 that the objective 1 can take in from an observation object O and the refractive index of the medium between the observation object O and the front surface of the objective 1. For an object in the air, for example, the numerical aperture does not become more than 1. Therefore, the cutoff frequency does not become more than $2/\lambda$. Accordingly, ordinary optical microscopes cannot resolve a fine structure with a period smaller than ½ of the wavelength of light that is placed in the air.

However, spatial frequency components of an observation image in a spatial frequency region that cannot be transferred by an image-forming optical system can be reflected in image formation by inserting a spatial frequency-modulating device between the observation object and the image-forming optical system. In this case, however, the observation object image formed by the image-forming optical system has been modulated. Therefore, a correct observation object image is formed by jointly using a device for restoring the modulated image (i.e. a demodulating device). Application of this technique to an optical microscope makes it possible to resolve a fine structure of an observation object having a spatial frequency higher than the conventional cutoff frequency. This is referred to as "superresolution".

W. Lukosz, "Optical systems with resolving powers exceeding the classical limit. II", Journal of the Optical Society of America, Vol. 57, No. 7 (1967), pp. 932–941, discloses a method of obtaining superresolution by using a system arranged as shown in FIG. 19. That is, diffraction gratings 5 and 6 having conjugate grating constants are placed at respective positions conjugate to each other. More specifically, the diffraction grating 5 is placed at a position between an observation object O and an image-forming optical system 3 and near the observation object O. The diffraction grating 6 is placed behind a position where an image of the observation object O is formed by the image-forming optical system 3. With this arrangement, the diffraction gratings 5 and 6 are moved conjugably to thereby obtain superresolution. The diffraction grating 5, which is placed near the observation object O, diffracts and thus modulates light emanating from the observation object O. The light emanating from the observation object O includes spatial frequency components having angles at which they cannot enter the image-forming optical system 3. A part of such spatial frequency components are allowed to enter the image-forming optical system 3 by the modulation effected by the diffraction grating 5. That is, the propagation angle of a part of the spatial frequency components is changed by the diffraction, and the modulated components enter the image-forming optical system 3. The diffraction grating 5 produces a plurality of diffracted light beams. Therefore, an input image having a plurality of modulation components is transferred by the image-forming optical system 3, and a modulated image 4 is formed at the image-formation position of the image-forming optical system 3. The diffraction grating 6, which is placed behind the image-formation position demodulates the modulated image 4. More specifically, each modulation component having a propagation angle changed by the diffraction grating 5 near the observation object O is transferred by the image-forming optical system 3 and then passed through the diffraction grating 6, thereby restoring the changed propagation angle to the original state to form a restored image. Thus, spatial frequency components that cannot be transferred by only the image-forming optical system 3 can also be reflected in image formation by combining the image-forming optical system 3 with the diffraction gratings 5 and 6, and superresolution can be attained. However, W. Lukosz admits in the paper that it is not easy to realize such an arrangement and drive of diffraction gratings.

On the other hand, D. Mendlovic et. al., "One-dimensional superresolution optical system for temporally restricted objects", Applied Optics, Vol. 36, No. 11 (1997), pp. 2353–2359, discloses that they were successful in an experiment designed to obtain superresolution with a single rotary diffraction grating 7, as shown in FIG. 20, by using an arrangement in which an observation object O and a modulated image 4 of the observation object O, which is formed by an image-forming optical system 3, are placed in approximately the same plane. However, in such an arrangement, the magnification of the image of the observation object O formed by the image-forming optical system 3 is substantially limited to −1.

FIG. 21 shows the arrangement of a novel optical system presented by Dr. Tony Wilson (University of Oxford, Oxford, UK) at the 20th Lecture Meeting of the Society for the Research of Laser Microscopes held on Nov. 7, 1997. The optical system includes a movable diffraction grating 8, an illuminating optical system 9 that projects an image of the diffraction grating 8 on the focal position of an objective 1, an image-forming optical system 3 that forms an enlarged image of an observation object O, a CCD 10 that detects the image of the observation object O formed by the image-forming optical system 3, an image storage unit 11 that stores the image detected by the CCD 10, an arithmetic unit 12 that performs an arithmetic operation using the image stored in the image storage unit 11, and an image display unit 13 that displays the result of the arithmetic operation performed by the arithmetic unit 12. A combination of the diffraction grating 8 and the illuminating optical system 9 illuminates the observation object O with illuminating light having a sinusoidal intensity distribution. Three images of the observation object O are detected by the CCD 10 in respective states where the spatial phases of the sine wave of the illuminating light on the observation object O are different from each other by 120 degrees. From the intensity distributions $I_1$, $I_2$ and $I_3$ of the three images detected by the CCD 10, a light-cut image $I_c$ is obtained by calculating the following equation:

$$I_c = \sqrt{\{(I_2-I_1)^2+(I_3-I_2)^2+(I_1-I_3)^2\}} \qquad (2)$$

When the observation object O is at the in-focus position of the objective 1, it is illuminated with sinusoidal illuminating light of strong contrast. Therefore, a difference is produced between the intensities $I_1$, $I_2$ and $I_3$ of the three images, and $I_c$ assumes a finite value according to the characteristics of the sample. On the other hand, when the observation object O is off the in-focus position of the objective 1, the observation object O is illuminated with illuminating light having almost no contrast. Therefore, there is no difference between the intensities $I_1$, $I_2$ and $I_3$ of the three images, and $I_c$ is almost zero. Consequently, only an image near the in-focus plane of the objective 1 is obtained. Thus, a light-cut image is obtained as in the case of a confocal image obtained by a conventional confocal microscopy using a pinhole. Therefore, this method will be hereinafter referred to as "fringe projection light-cut microscopy". The conventional confocal microscopy requires a high-intensity light source, e.g. an ultra high-pressure mercury lamp, whereas the fringe projection light-cut microscopy can use a low-intensity light source, e.g. a halogen lamp, and does not require a scanning optical system as needed in the conventional confocal microscopy. Accordingly, fringe projection light-cut microscopy has an advantage over conventional confocal microscopy in that it can be realized by a simple and low-cost system.

If the above-described methods proposed by W. Lukosz and D. Mendlovic, et al. are applied to an optical microscope, the following problems arise: With the method proposed by W. Lukosz, superresolution is obtained by synchronously moving the diffraction gratings 5 and 6, which are placed near the observation object O and the object image, respectively. In the case of a microscope, however, a magnifying power is introduced into the image formation. Therefore, the diffraction gratings 5 and 6, which have different grating constants, must be moved conjugably at respective positions while maintaining the conjugate relation therebetween. This is very difficult to realize. The method proposed by D. Mendlovic et al. cannot be implemented in an optical microscope in which a magnifying power other than +1 is introduced.

If it is intended to perform real-time observation with the fringe projection light-cut microscopy proposed by Dr. Tony Wilson, the following problems arise: Because equation (2) includes three squaring computations and one square root computation, a great deal of time is needed to calculate equation (2). Therefore, real-time observation cannot be performed. In addition, the light-cut image IC obtained by using equation (2) contains nonlinear components with respect to the intensities $I_1$, $I_2$ and $I_3$ of the image obtained by directly imaging the observation object O. Therefore, the light-cut image IC appears unnatural.

SUMMARY OF THE INVENTION

In view of the above-described problems with the prior art, a first object of the present invention is to provide a microscopy that is satisfactorily implementable to obtain superresolution and also provide an apparatus for carrying out the microscopy.

A second object of the present invention is to provide a fringe projection light-cut microscopy capable obtaining a natural light-cut image and enabling real-time observation and also provide an apparatus for carrying out the fringe projection light-cut microscopy.

To attain the above-described objects, the present invention provides an image-forming method including a component separating step at which, with respect to a plurality of modulated images of an observation object that are formed by subjecting the observation object to spatial modulation including a plurality of modulation components while varying the component ratios of the modulation components for each spatial modulation process, modulated image components corresponding to the modulation components are separated from the number of modulated images that is not less than the number of the modulation components by using linear computation. The image-forming method further includes a component demodulating step at which at least one of the modulated image components separated at the component separating step is demodulated.

In addition, the present invention provides an image-forming apparatus including a spatial modulation device that causes a plurality of spatial modulation components to act on shape information light having shape information concerning an observation object with different combinations of the component ratios of the spatial modulation components. An image-forming optical system forms modulated images of the observation object, which have been spatially modulated by the spatial modulation components. A component separating device separates modulated image components corresponding to the modulation components from the number of modulated images that is not less than the number of the modulation components by using linear computation. A component demodulating device demodulates at least one of the modulated image components separated by the component separating device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The present invention will be described below first with regard to embodiments of the image-forming method and apparatus capable of attaining the above-described objects, together with the operation/working-effect of each of the embodiments. Then, preferred arrangements that can be additionally applied to the present invention, together with the operation/working-effect of each of the arrangements, will be described, followed by a description of embodiments thereof.

The image-forming method according to the present invention is characterized by including a component separating step at which, with respect to a plurality of modulated images of an observation object that are formed by subjecting the observation object to spatial modulation including a plurality of modulation components while varying the component ratios of the modulation components for each spatial modulation process, modulated image components corresponding to the modulation components are separated from the number of modulated images that is not less than the number of the modulation components by using linear computation, and a component demodulating step at which at least one of the modulated image components separated at the component separating step is demodulated.

A modulated image of an observation object subjected to spatial modulation including a plurality of modulation components is equal to what is obtained by adding together modulated image components obtained by making each of the modulation components act on the observation object one by one, after each modulated image component has been multiplied by the component ratio of each modulation component. This indicates that when each component ratio is known, it is possible to form a simultaneous system of linear equations respectively containing the modulated image components as unknown quantities. If the number of combinations of linearly independent component ratios that is not less than the number of the modulated image components, which are unknown quantities, are known and modulated images corresponding to the combinations of linearly independent component ratios are also known, each modulated image component can be extracted independently by solving the simultaneous system of linear equations. After being extracted, each modulated image component is subjected to appropriate demodulation corresponding to each modulation component, thereby enabling image restoration to be performed. It should be noted that at the step of solving the simultaneous system of linear equations, all the modulated image components need not be extracted, but only necessary modulated image components may be extracted by linear computation using the famous Kramers theorem.

Figure 11:
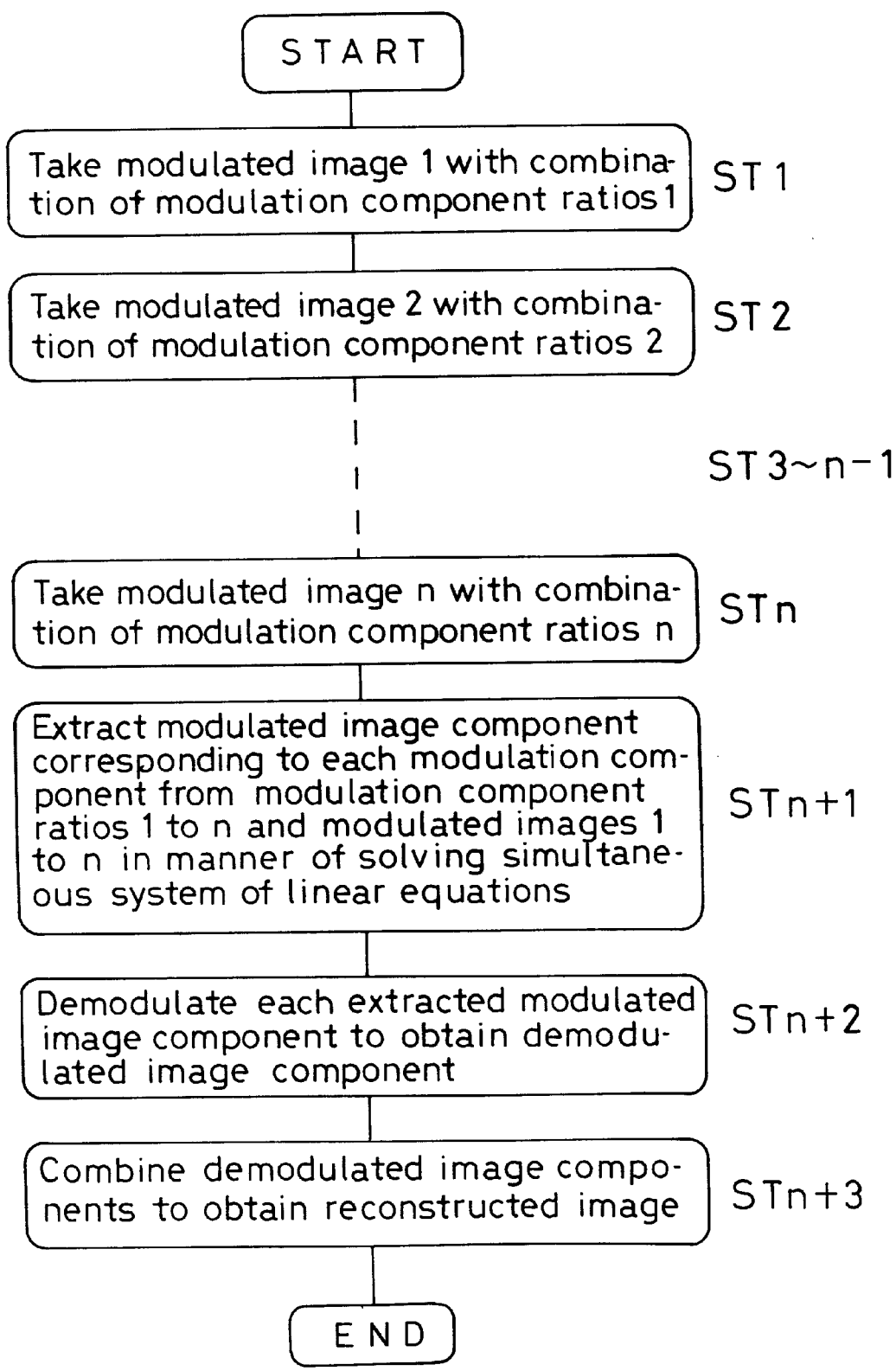
FIG. 11 is a flowchart showing the image-forming method according to the present invention.
Figure 12:
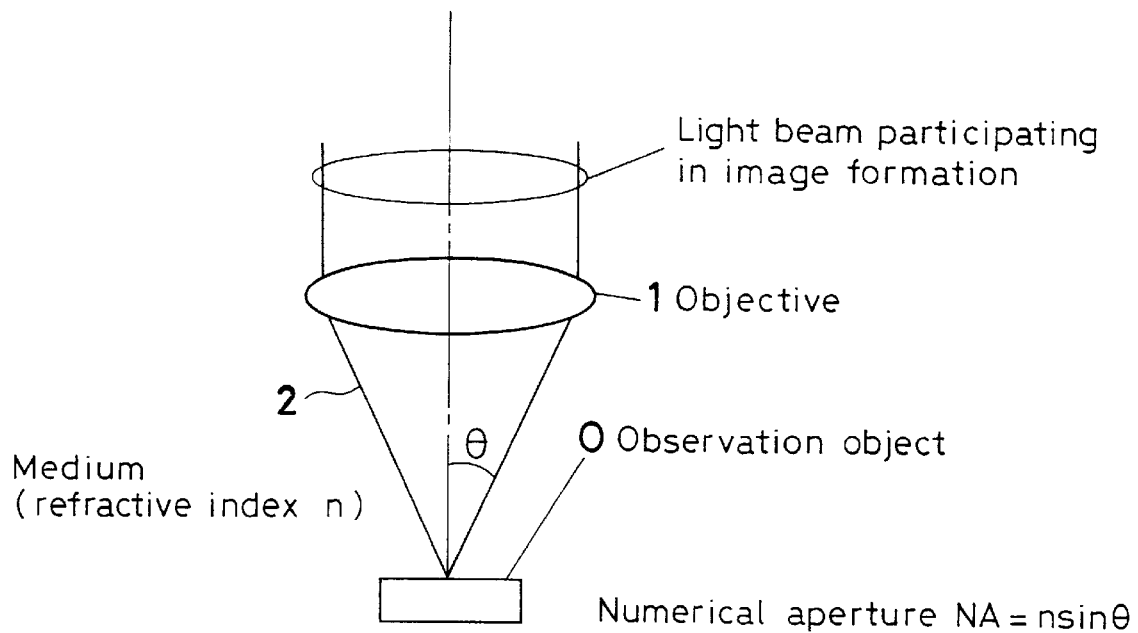
FIG. 12 is a diagram for describing the numerical aperture.

FIG. 11 shows a typical flowchart executed in a case where the image-forming method according to the present invention is used. In FIG. 11, at step ST1, a modulated image 1 is taken with a combination of modulation component ratios 1. At step ST2, a modulated image 2 is taken with a combination of modulation component ratios 2. Similarly, at steps ST3 to STn, modulated images 3 to n are taken with combinations of modulation component ratios 3 to n, respectively. Next, at step STn+1, a modulated image component corresponding to each modulation component is extracted from the modulation component ratios 1 to n and the modulated images 1 to n in the manner of solving a simultaneous system of linear equations. At step STn+2, each extracted modulated image component is demodulated to obtain a demodulated image component. At step STn+3, the demodulated image components are combined together to obtain a reconstructed image.

Thus, in the image-forming method according to the present invention, each modulated image component is extracted from a plurality of modulated images by linear computation. Therefore, a restored image can be readily obtained by subjecting each modulated image component to appropriate demodulating action by image processing or the like. Furthermore, because only necessary modulated image components can be taken out and demodulated, a desired restored image can be obtained efficiently.

In addition, a superresolution microscope that uses the present invention can be realized with a much simpler and practical system arrangement in comparison to the methods proposed by W. Lukosz and D. Mendlovic et al., in which two diffraction gratings are synchronously moved.

Furthermore, the fringe projection light-cut microscopy that uses the present invention enables each modulated image component to be extracted by only linear computation and hence allows a restored image to be obtained at much higher speed than the computational method proposed by Dr. Tony Wilson, which uses equation (2). In addition, because the light-cut image $I_c$ does not contain a nonlinear term of image intensity obtained by direct imaging, a natural image is provided advantageously.

In one preferred embodiment thereof, the present invention is applied to an image-forming method in which shape information light having shape information concerning an observation object is subjected to spatial modulation, and a modulated image of the observation object, which has been spatially modulated, is formed by an image-forming optical system, and then the modulated image is demodulated, thereby reconstructing spatial frequency components of the shape information in a range exceeding the spatial frequency region determined by the transfer function of the image-forming optical system. According to the embodiment, the spatial modulation includes a plurality of modulation components, and the image-forming method includes a modulated image forming step at which a plurality of modulated images are formed through the spatial modulation with different combinations of the component ratios of the modulation components. The image-forming method further includes a component separating step at which modulated image components corresponding to the modulation components are separated from the number of modulated images that is not less than the number of the modulation components by using linear computation, and a component demodulating step at which at least one separated modulated image component is demodulated. The described arrangement of the embodiment makes it possible to form an image containing spatial frequency components of the shape information concerning the observation object that cannot be transferred by a conventional image-forming optical system alone, by using a spatial modulation device convenient for each particular observation system. Accordingly, the superresolution microscopy can be attained for an even wider range of observation objects, favorably.

Let us assume that shape information light having shape information concerning an observation object is $O(x)$; spatial modulation including a plurality of modulation components $M_i(x)$ with component ratios $m_i$ is $M(x)$; and the point-spread function which is the inverse Fourier transform of the transfer function of an image-forming optical system is $P(x)$. On this assumption, a modulated image $I(x)$ of an observation object formed by coherent and incoherent image-forming optical systems is given by $$I(x) = \{O(x) \cdot M(x)\} * P(x) \quad (3)$$

$$= \left\{O(x) \cdot \sum_i m_i M_i(x)\right\} * P(x)$$

$$= \sum_i m_i \{O(x) \cdot M_i(x)\} * P(x)$$

where the mark * represents a convolution operator.

It will be apparent that if a combination of linearly independent $m_i$ is used, each modulated image component $\{O(x) \cdot M_i(x)\} * P(x)$ can be extracted by using linear computation. If each modulated image component can be extracted independently, it is easy to demodulate the extracted modulated image component.

In one preferred embodiment of the present invention, the spatial modulation includes an exponential function type modulation component that multiplies the shape information light by an exponential function type modulation coefficient in the form of $\exp(j2\pi f_0 x + j\phi)$ [where j is a unit complex number $\sqrt{(-1)}$; $\pi$ is the circle ratio; $f_0$ is a constant representing the spatial frequency; x is a position coordinate on the observation object; and $\phi$ is a phase constant]. This is a convenient scheme for readily obtaining modulation components that shift the spatial frequency. As will be clear from the Fourier transform thereof, i.e. $\exp(j\phi)\delta(f-f_0)$, the exponential function type modulation component $\exp(j2\pi f_0 x + j\phi)$ has the property of shifting the spatial frequency by $+f_0$ and hence makes it possible to transfer shape information concerning the observation object that has a spatial frequency greater than the cutoff frequency of the image-forming optical system. The exponential function type modulation is particularly favorable for a coherent image-forming optical system because it can be readily realized therein by oblique illumination.

In one preferred embodiment of the present invention, the spatial modulation includes a sinusoidal wave type modulation component that multiplies the shape information light by a sinusoidal wave type modulation coefficient in the form of $\cos(2\pi f_0 x + \phi)$ [where $\pi$ is the circle ratio; $f_0$ is a constant representing the spatial frequency; x is a position coordinate on the observation object; and $\phi$ is a phase constant]. This is a convenient scheme for readily obtaining modulation components that shift the spatial frequency. It should be noted that in this embodiment the spatial modulation is expressed by the cosine function and referred to as "sinusoidal wave type modulation" for the sake of convenience because the cosine function and the sine function have the identical waveform; they are different only in the phase. As will be clear from the Fourier transform thereof, i.e. $[\cos\phi\{\delta(f-f_0)+\delta(f+f_0)\}+j\sin\phi\{\delta(f-f_0)-\delta(f+f_0)\}]/2$, the sinusoidal wave type modulation component $\cos(2\pi f_0 x + \phi)$ contains components that shift the spatial frequency by $\pm f_0$ and hence makes it possible to transfer shape information concerning the observation object that has a spatial frequency greater than the cutoff frequency of the image-forming optical system. The sinusoidal wave type modulation is particularly favorable for an incoherent image-forming optical system because it can be readily realized therein.

In one preferred embodiment of the present invention, when the spatial modulation is $\exp(j2\pi f_0 x + j\phi)$ or $\cos(2\pi f_0 x + \phi)$, the modulated image forming step includes the step of forming a plurality of modulated images of different phase constant $\phi$. This is a convenient scheme for readily performing the spatial modulation with different component ratios of the modulation components. When the spatial modulation is $\exp(j2\pi f_0 x + j\phi)$ or $\cos(2\pi f_0 x + \phi)$, as will be clear from the Fourier transform thereof, i.e. $\exp(j\phi)\delta(f-f_0)$ or $\{\exp(j\phi)\delta(f-f_0)+\exp(-j\phi)\delta(f+f_0)\}/2$, the coefficient of the component $\delta(f-f_0)$ or $\delta(f+f_0)$ that shifts the spatial frequency component by $\pm f_0$ can be changed independently by varying the phase constant $\phi$.

In one preferred embodiment of the present invention, when the spatial modulation is $\exp(j2\pi f_0 x + j\phi)$ or $\cos(2\pi f_0 x + \phi)$, the component demodulating step includes an exponential function type demodulating step at which a modulated image component is multiplied by an exponential function type demodulation coefficient in the form of $\exp(j2\pi f_0 x)$ or $\exp(-j2\pi f_0 x)$. This is a convenient scheme for obtaining a favorable restored image. When the spatial modulation is $\exp(j2\pi f_0 x + j\phi)$ or $\cos(2\pi f_0 x + \phi)$, as will be clear from the Fourier transform thereof, i.e. $\exp(j\phi)\delta(f-f_0)$ or $\{\exp(j\phi)\delta(f-f_0)+\exp(-j\phi)\delta(f+f_0)\}/2$, an extracted modulated image component is given in the form of $\exp(\pm j2\pi f_0 x)\{O(x)*P_{+-}(x)\}$ (where $P_{+-}(x)$ is a function in which the spatial frequency of $P(x)$ is shifted in the Fourier space by $\pm f_0$), exclusive of the constant term. The exponential function type demodulation coefficient can remove the modulation term $\exp(\pm j2\pi f_0 x)$ from the top of the expression.

In one preferred embodiment of the present invention, when the spatial modulation is $\exp(j2\pi f_0 x + j\phi)$ or $\cos(2\pi f_0 x + \phi)$, the component demodulating step includes a sinusoidal wave type demodulation step at which a modulated image component is multiplied by a sinusoidal wave type demodulation coefficient in the form of $\cos(2\pi f_0 x)$ or $\sin(2\pi f_0 x)$. This is a convenient scheme for obtaining a favorable restored image. When the spatial modulation is $\exp(j2\pi f_0 x + j\phi)$ or $\cos(2\pi f_0 x + \phi)$, as will be clear from the Fourier transform thereof, i.e. $\{\cos\phi+j\sin\phi)\delta(f-f_0)$ or $[\cos\phi\{\delta(f-f_0)+\delta(f+f_0)\}+j\sin\phi\{\delta(f-f_0)-\delta(f+f_0)\}]/2$, an extracted modulated image component is given in the form of $\{\cos(2\pi f_0 x)\pm j\sin(2\pi f_0 x)\}\{O(x)*P_{+-}(x)\}$ (where $P_{+-}(x)$ is a function in which the spatial frequency of $P(x)$ is shifted in the Fourier space by $\pm f_0$), exclusive of the constant term. The sinusoidal wave type demodulation coefficient can remove the modulation term $\{\cos(2\pi f_0 x)\pm j\sin(2\pi f_0 x)\}$ from the top of the expression by using the relationship of $\cos^2(2\pi f_0 x)+\sin^2(2\pi f_0 x)=1$, for example.

In one preferred embodiment of the present invention, when the spatial modulation is $\exp(j2\pi f_0 x + j\phi)$ or $\cos(2\pi f_0 x + \phi)$, the component demodulating step includes an absolute value type demodulation step at which the absolute value of a modulated image component is taken. This is a convenient scheme for obtaining a favorable restored image. When the spatial modulation is $\exp(j2\pi f_0 x + j\phi)$ or $\cos(2\pi f_0 x + \phi)$, an extracted modulated image component is given in the form of $\exp(\pm j2\pi f_0 x)\{O(x)*P_{+-}(x)\}$, exclusive of the constant term, as has been stated above. By taking the absolute value of the modulated image component, the modulation term $\exp(\pm j2\pi f_0 x)$ can be removed from the top of the expression. This method enables modulated image components to be demodulated even if the spatial frequency constant $f_0$ used for the modulation is not known, in contrast to the exponential function type demodulation step or the sinusoidal wave type demodulation step.

In one preferred embodiment of the present invention, a plurality of demodulated image components obtained by demodulating the modulated image components at the component demodulating step are added together after each has been multiplied by an appropriate coefficient, thereby obtaining a restored image of the observation object. This is a convenient scheme for obtaining a favorable restored image. Demodulated image components subjected to modulation containing an element that shifts the spatial frequency may have a distribution biased in terms of the spatial frequency in the Fourier space. Therefore, a plurality of demodulated image components that are differently biased in terms of the spatial frequency are added together after each has been multiplied by an appropriate coefficient. By doing so, it is possible to obtain a restored image that is balanced in terms of the spatial frequency in the Fourier space.

In one preferred embodiment of the present invention, the spatial modulation is performed by a diffraction grating placed in contact with the observation object. By doing so, spatial modulation in the form of $\exp(j2\pi f_0 x + j\phi)$ or $\cos(2\pi f_0 x + \phi)$ can be readily performed. The phase constant $\phi$ can be readily varied by moving the diffraction grating relative to the observation object.

In one preferred embodiment of the present invention, the spatial modulation is performed by using illuminating light that illuminates the observation object. By doing so, spatial modulation in the form of $\exp(j2\pi f_0 x + j\phi)$ or $\cos(2\pi f_0 x + \phi)$ can be readily performed. The phase constant $\phi$ can be readily varied by moving the illuminating light relative to the observation object.

In one preferred embodiment of the present invention, a device that forms interference fringes by coherent light emitted from a coherent light source is used as a spatial modulation device. In this case, the spatial modulation is performed by interference fringes. Therefore, spatial modulation having a fine structure can be realized without the need to form a diffraction grating. In addition, it is easy to change the spatial modulation frequency.

In one preferred embodiment of the present invention, a spatial modulation device includes a coherent light source, a beam splitting device that splits illuminating light emitted from the coherent light source into at least two illuminating light beams, and a light modulator that modulates the phase of at least one of the illuminating light beams relative to the other illuminating light beam. The illuminating light beams may be at least two approximately parallel light beams incident on the observation object from the direction of the image-forming optical system at an angle larger than the object-side numerical aperture of the image-forming optical system. In this case, the illuminating light passes outside the image-forming optical system. Therefore, spatial modulation of very high frequency can be given to the observation object. Consequently, the transfer function for a reconstructed image has a value up to a high-frequency region, advantageously.

In one preferred embodiment of the present invention, a spatial modulation device includes a coherent light source, a beam splitting device that splits illuminating light emitted from the coherent light source into at least two illuminating light beams, a light modulator that modulates the phase of at least one of the illuminating light beams relative to the other illuminating light beam, and a condenser lens that concentrates the two illuminating light beams on different positions near the pupil plane of the image-forming optical system or near a plane conjugate to the pupil plane. In this case, the illuminating light passes inside the image-forming optical system. Accordingly, even in a case where the object-side numerical aperture of the image-forming optical system is large as in a liquid immersion objective, the observation object can be illuminated with a practical arrangement.

In one preferred embodiment of the present invention, a device that changes the beam width of illuminating light is used as a spatial modulation device. In this case, because the beam width of illuminating light can be changed, it is possible to prevent illuminating light from being applied to an unnecessary portion of the observation object during measurement.

In one preferred embodiment of the present invention, a spatial modulation device includes a coherent light source, a beam splitting device that splits illuminating light emitted from the coherent light source into at least two illuminating light beams, a light modulator that modulates the phase of at least one of the illuminating light beams relative to the other illuminating light beam, and a deflecting device that deflects the direction of each illuminating light beam. The illuminating light beams may be deflected so as to be incident on the observation object sideways from different positions, respectively. In this case, because the illuminating light is incident on the observation object from the sides thereof, it is possible to use a wide space around the observation object.

In one preferred embodiment of the present invention, the deflecting device can change the angle formed between the illuminating light beams. In this case, because the angle between a plurality of illuminating light beams can be changed, it is possible to change the spatial frequency of the spatial modulation given to the observation object and hence possible to perform measurement suitable for each particular observation object.

In one preferred embodiment of the present invention, an image-forming apparatus including a spatial modulation device as stated above is provided with an image pickup device that detects a modulated image of the observation object formed by the image-forming optical system, an image storage unit that stores the modulated image of the observation object detected by the image pickup device, an arithmetic unit that performs an arithmetic operation using the images stored in the image storage unit, and an image display unit that displays the result of the arithmetic operation performed by the arithmetic unit. In this case, because the image-forming apparatus has the image storage unit, the arithmetic unit and the image display unit, it is possible to automatically perform the storage of the image, the arithmetic operation and the display of the result of the arithmetic operation.

In one preferred embodiment of the present invention, an image-forming apparatus including a spatial modulation device as stated above has an image pickup device that detects a modulated image of the observation object formed by the image-forming optical system, an image storage unit that stores the modulated image of the observation object detected by the image pickup device, an arithmetic unit that performs an arithmetic operation using the images stored in the image storage unit, an image display unit that displays the result of the arithmetic operation performed by the arithmetic unit, a moving mechanism that moves a diffraction grating, and a device that supplies the image storage unit or the arithmetic unit with information concerning the movement of the diffraction grating from the moving mechanism. In this case, because the image storage unit or the arithmetic unit is supplied with information concerning the movement of the diffraction grating from the moving mechanism, which moves the diffraction grating, component demodulation can be effected accurately.

In one preferred embodiment of the present invention, an image-forming apparatus including a spatial modulation device as stated above has an image pickup device that detects a modulated image of the observation object formed by the image-forming optical system, an image storage unit that stores the modulated image of the observation object detected by the image pickup device, an arithmetic unit that performs an arithmetic operation using the images stored in the image storage unit, an image display unit that displays the result of the arithmetic operation performed by the arithmetic unit, a light modulator that changes the phase difference of illuminating light, and a device that supplies the image storage unit or the arithmetic unit with phase difference information from the light modulator. In this case, because the image storage unit or the arithmetic unit is supplied with phase difference information from the light modulator, component demodulation can be effected accurately.

In one preferred embodiment of the present invention, a defect inspection system including an image-forming apparatus as stated above is constructed. In this case, because an image of high resolution can be obtained with the image-forming apparatus, a high-resolution defect inspection system can be realized. In the defect inspection system, the obtained image is compared with a reference pattern held in the arithmetic unit to detect a difference therebetween as a defect.

In one preferred embodiment of the present invention, a positioning system including an image-forming apparatus as stated above is constructed. In this case, because an image of high resolution can be obtained with the image-forming apparatus, it is possible to realize a positioning system capable of positioning the observation object with high accuracy. In the positioning system, the obtained image is compared with information concerning a reference position held in the arithmetic unit to calculate a displacement therebetween, and the observation object is moved on the basis of information concerning the calculated displacement, thereby positioning the observation object with high accuracy.

In one preferred embodiment of the present invention, a displacement measuring system including an image-forming apparatus as stated above is constructed. In this case, because an image of high resolution can be obtained with the image-forming apparatus, a high-resolution displacement measuring system can be realized. In the displacement measuring system, the same observation object is measured at different times, and a plurality of images thus obtained are taken into the arithmetic unit to detect a displacement between the images measured at different times.

In one preferred embodiment of the present invention, a pass/fail checking system including an image-forming apparatus as stated above is constructed. In this case, because an image of high resolution can be obtained with the image-forming apparatus, a high-resolution pass/fail checking system can be realized. In the pass/fail checking system, the obtained image is compared with a reference pattern held in the arithmetic unit to calculate a difference therebetween, and the calculated difference is compared with a criterion of judgement held in the arithmetic unit.

In one preferred embodiment of the present invention, three-dimensional configuration measuring system including an image-forming apparatus as stated above is constructed. In this case, because an image of high resolution can be obtained with the image-forming apparatus, a high-resolution three-dimensional configuration measuring system can be realized. In the three-dimensional configuration measuring system, the observation object is measured in a plurality of different conditions by varying the distance between the observation object and the image-forming optical system in the optical axis direction, thereby capturing a plurality of modulated images or restored images, and the three-dimensional configuration of the observation object is calculated from the modulated or restored images.

Embodiments of the present invention will be described below with reference to the accompanying drawings.

Figure 1:
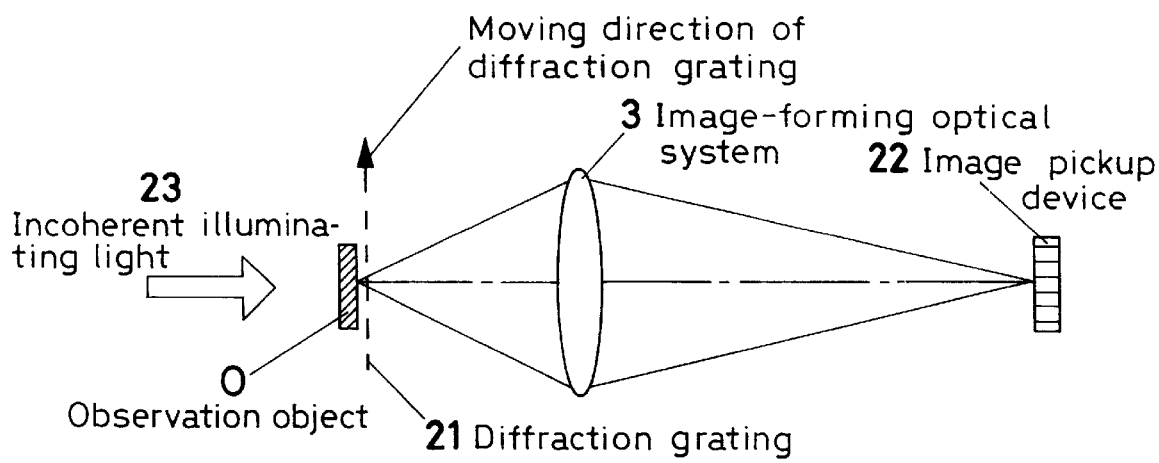
FIG. 1 is a diagram showing the arrangement of an optical system for carrying out an image-forming method according to a first embodiment of the present invention.

FIG. 1 shows the arrangement of an optical system for carrying out an image-forming method according to a first embodiment of the present invention. As shown in the figure, the optical system includes a movable diffraction grating 21 as a spatial modulation device, which is placed in contact with an observation object O. An image-forming optical system 3 projects an enlarged image of the observation object O through the diffraction grating 21. An image pickup device 22, e.g. a CCD, detects the image of the observation object O formed by the image-forming optical system 3. The observation object O is illuminated with incoherent illuminating light 23.

Figure 2:
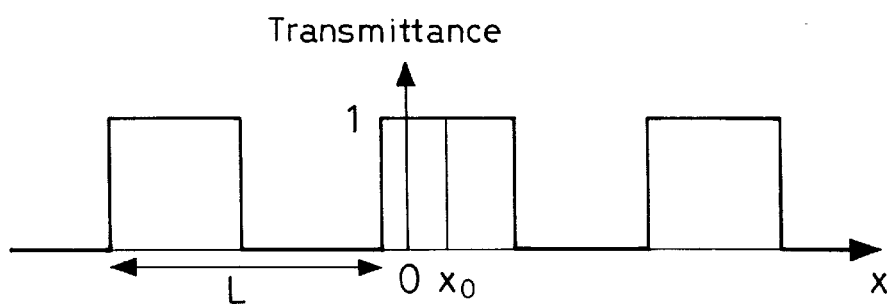
FIG. 2 is a diagram showing the transmittance distribution of a diffraction grating used in the first and third embodiments.

As shown in FIG. 2, the diffraction grating 21 is a rectangular amplitude grating with a period L. The diffraction grating 21 has transparent and non-transparent portions alternately disposed thereon. Each of the transparent and non-transparent portions has a width of L/2. When the center of the diffraction grating 21 is displaced by $x_0$ from an optical axis, spatial modulation takes place as expressed by the following function:

$$M(x) = 1/2 + \sum_{i=0}^{\infty} m_i \cos(2\pi f_i x + \phi_i) \quad (4)$$

where $$m_i = (-1)^i \pi / \{8(2i+1)\};$$
$$f_i = (2i+1)/L;$$
$$\phi_i = 2\pi f_i x_0$$

At this time, a modulated image I(x) of the observation object is given according to equation (3) as follows:

$$I(x) = \left[ O(x) \left[ 1/2 + \sum_{i=0}^{\infty} m_i \{ \exp(j\phi_i)\exp(j2\pi f_i x) + j\exp(-j\phi_i)\exp(-j2\pi f_i x) \} \right] \right] * P(x) \quad (5)$$

$$= O(x) * P(x)/2 + \sum_{i=0}^{\infty} m_i [\exp(j\phi_i)\exp(j2\pi f_i x) \times [O(x) * \{P(x)\exp(-j2\pi f_i x)\}] +$$

$$j\exp(-j\phi_i)\exp(-j2\pi f_i x) \times [O(x) * \{P(x)\exp(j2\pi f_i x)\}]]$$

In the above equation, $P_{+-fi}(x) \equiv P(x)\exp(\geq j2\pi f_i x)$ is equal to a point spread function obtained when the transfer function of the image-forming optical system 3 is shifted by the spatial frequency $\pm f_i$, and $O(x) * P_{+-fi}(x)$ contains components in a spatial frequency region that cannot be transferred by the image-forming optical system 3 alone.

If the image I(x) is taken with $x_0$ shifted little by little, i.e. while the diffraction grating 21 is being moved in a plane perpendicular to the direction of the optical axis, the value of the coefficient $\exp(\pm j \phi_i)$ in equation (5) changes. Accordingly, a simultaneous system of linear equations respectively having terms containing $\exp(\pm j2\pi f_i x)\cdot\{O(x) * P_{-+fi}(x)\}$ as unknown quantities is derived. Strictly speaking, equation (5) has an infinite number of unknown quantities. However, the unknown quantities can be limited to a finite number in a case here there is a certain limit to the spatial frequency of he observation object O, or in a case where the resolution of the image pickup device 22 is finite. It is also possible to limit the unknown quantities to a finite number by limiting the range of spatial frequencies of the restored image. If the number of modulated images I(x) for $x_0$ that is not smaller than the finite number of unknown quantities are obtained, each unknown quantity $\exp(\pm j2\pi f_i x)\cdot\{O(x) * P_{-+fi}(x)\}$ is uniquely obtained. If each $\exp(\pm j2\pi f_i x)\cdot\{O(x) * P_{-+fi}(x)\}$ thus obtained is multiplied by the demodulation coefficient $\exp\{-(\pm j2\pi f_i x)\}$, a demodulated image component $O(x) * P_{-+fi}(x)$ can be extracted.

Figure 3:
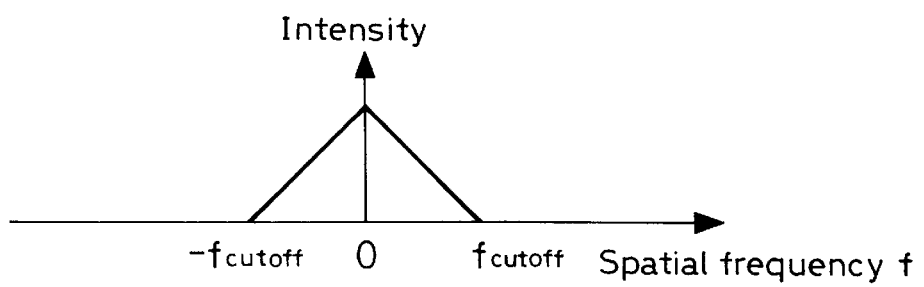
FIGS. 3(*a*) and 3(*b*) are diagrams showing the transfer function of an image-forming optical system in the first embodiment and the transfer function for a reconstructed image.
Figure 3:
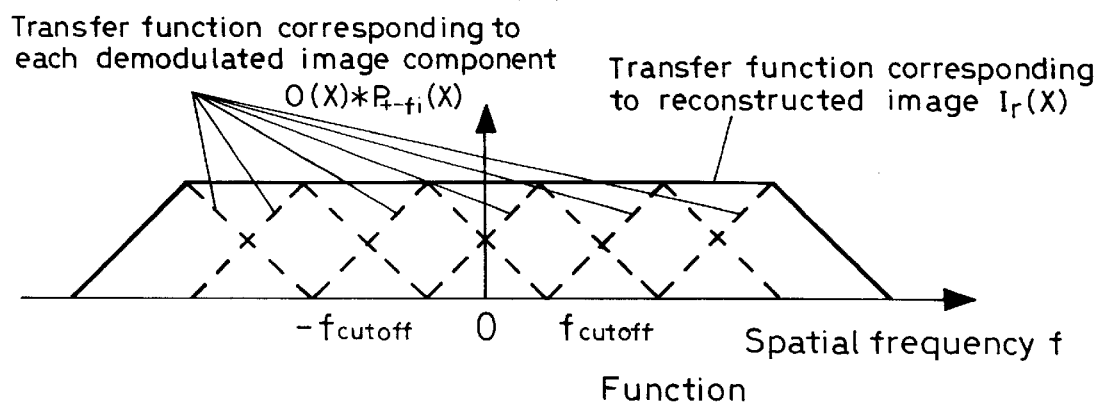

As shown in FIG. 3(a), the image-forming optical system 3 in this embodiment can transfer information only within the spatial frequency region of $<f_{cutoff}<f<f_{cutoff}$. On the other hand, the period L of the diffraction grating 21 in this embodiment is set at $L=2/f_{cutoff}$. Accordingly, a restored image $I_r(x)$ is obtained by adding together all the restored demodulated image components $O(x) * P_{+-fi}(x)$ as follows:

$$I_r(x) = \Sigma_i O(x) * P_{+-fi}(x) = O(x) * \Sigma_i P_{+-fi}(x) \quad (6)$$

As shown in FIG. 3(b), the restored image $I_r(x)$ is equal to an observation image formed by an image-forming system having a cutoff frequency greater than the transfer function of the image-forming optical system 3 and thus shows superresolution.

Although incoherent image formation is assumed in this embodiment, it will be clear that superresolution can be similarly obtained in the case of coherent image formation because the image formation equation (3) is isomorphic.

Figure 4:
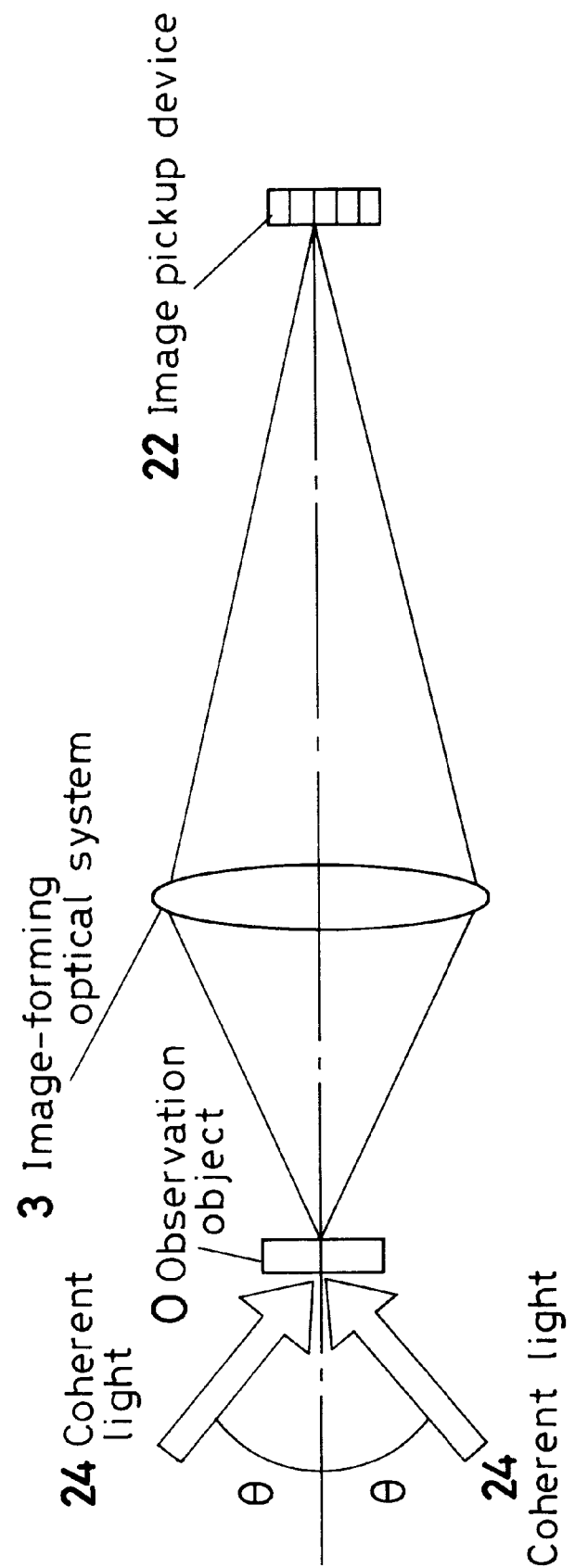
FIG. 4 is a diagram showing the arrangement of an optical system for carrying out an image-forming method according to a second embodiment of the present invention.

FIG. 4 shows the arrangement of an optical system for carrying out an image-forming method according to a second embodiment of the present invention. As shown in the figure, the optical system includes illuminating light 24, which is a coherent plane wave of wavelength $\lambda$ that is incident on an observation object O at an incident angle $\pm\theta$. An image-forming optical system 3 projects an enlarged image of the observation object O. An image pickup device 22 detects the object image projected by the image-forming optical system 3. Although not shown in the figure, an imaging optical system including the image pickup device 22 is arranged to be capable of detecting the complex amplitude distribution of the image by using an interferometer or the like.

A spatial modulation device in this embodiment comprises two light sources that illuminate an observation object O with coherent illuminating light, and an optical element placed between one of the two light sources and the observation object O. Coherent illuminating light from a first light source illuminates the observation object O directly. A wedge-shaped prism, for example, is placed between a second light source and the observation object O so that coherent illuminating light from the second light source illuminates the observation object O through the wedge-shaped prism. The two coherent illuminating light beams form interference fringes on the observation object O. The observation object O is spatially modulated by the interference fringes. In addition, by moving the wedge-shaped prism, the phase difference of illuminating light from the second light source can be changed. Consequently, the interference fringes move on the observation object O. It should be noted that the number of illuminating light sources is not necessarily limited to two. Three or more illuminating light sources may be prepared. These illuminating light sources may be arranged to illuminate the observation object O simultaneously at different angles. Alternatively, the illuminating light sources may be arranged to illuminate the observation object O selectively in combinations of some of them.

The spatial modulation by the oblique incidence illuminating light 24 is expressed by $$M(x) = \frac{1}{2}\{\exp(j\phi)\exp(j2\pi f_0 x) + \exp(-j\phi)\exp(-j2\pi f_0 x)\} = \cos(2\pi f_0 x + \phi) \quad (7)$$

where $f_0 = \sin\theta/\lambda$;

$\phi$ is the phase difference between the two illuminating light beams.

At this time, a modulated image I(x) of the observation object is given according to equation (3) as follows:

$$I(x)=\frac{1}{2}\times[\exp(j\,\phi)\exp(j2\pi f_0 x)\,\{O(x)^*P_-(x)\}+\exp(-j\,\phi)\exp(-j2\,\pi f_0 x)\,\{O(x)^*P_+(x)\}] \quad (8)$$

where $$P_{+-}(x)\equiv P(x)\exp(\pm j\,2\pi f_0 x)$$

Accordingly, if $I(x)$ is obtained for two $\phi$, modulated image components $\exp(\pm j2\pi f_0 x)\cdot\{O(x)^*P_{+-}(x)\}$ can be extracted independently. The modulation components thus extracted are multiplied by the demodulation coefficient #$\exp(\pm j\,2\pi f_0 x)$ to obtain demodulated image components $O(x)^*P_{+-}(x)$. Thereafter, the demodulated image components are added togetherto obtain a restored image. For example, assuming that modulated images corresponding to $\phi=0$ and $\phi=\pi/2$ are $I_0(x)$ and $I_1(x)$, $$O(x)^*P_{+-}(x)=\{I_0(x)\pm jI_1(x)\}\exp(\pm j2\,\pi f_0 x) \quad (9)$$

A restored image $I_r(x)$ is obtained by $$I_r(x)=2\{I_0(x)\cos(2\,\pi f_0 x)-I_1(x)\sin(2\,\pi f_0 x)\} \quad (10)$$

Figure 5:
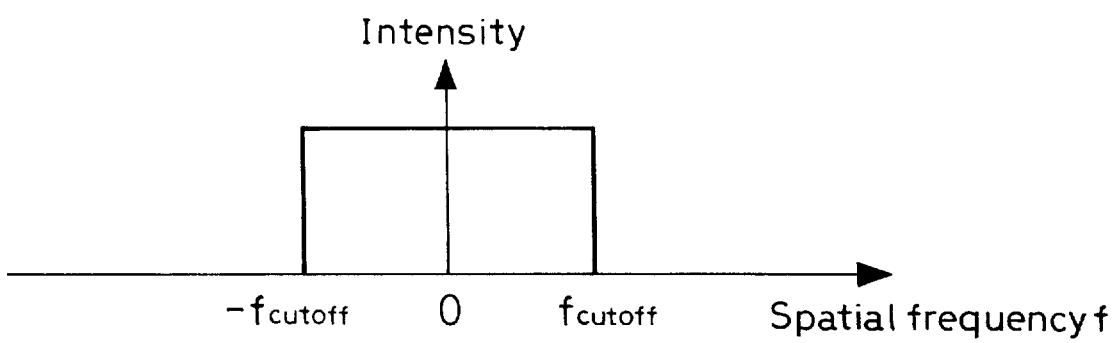
FIGS. 5(a) and 5(b) are diagrams showing the transfer function of an image-forming optical system in the second embodiment and the transfer function for a reconstructed image.
Figure 5:
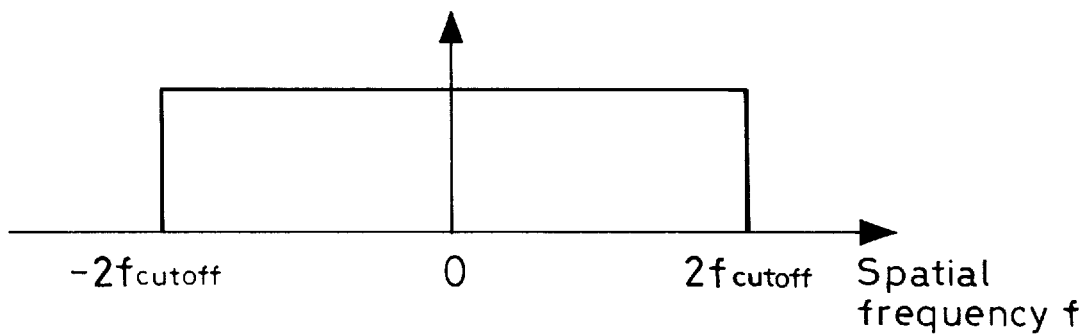

As shown in FIG. 5(a), the image-forming optical system 3 in this embodiment can transfer information only in the spatial frequency region of $-f_{cutoff}<f<f_{cutoff}$. The incident angle $\theta$ of the illuminating light 24 is set so that $f_0=f_{cutoff}$. Therefore, the restored image $I_r(x)$ is equal to an observation image formed by an image-forming system having a cutoff frequency double the transfer function of the image-forming optical system 3. Accordingly, the restored image $I_r(x)$ exhibits superresolution.

It will be apparent that if the number of coherent illuminating light beams 24 incident on the observation object O, the restored image can be formed over an even wider spatial frequency region of the observation object O.

Figure 6:
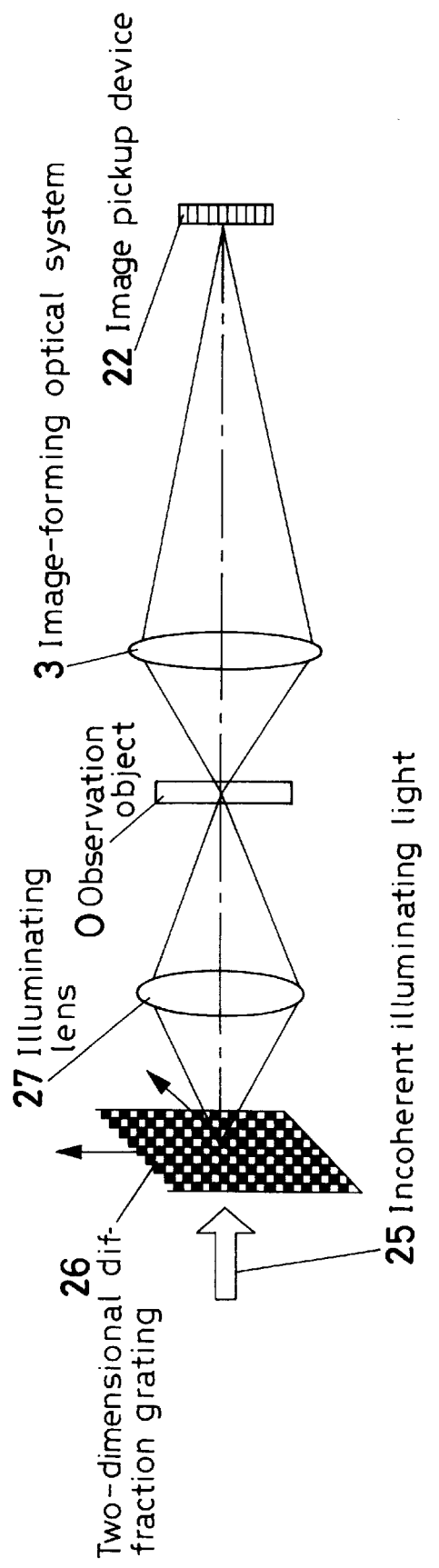
FIG. 6 is a diagram showing the arrangement of an optical system for carrying out an image-forming method according to the third embodiment of the present invention.
Figure 7A:
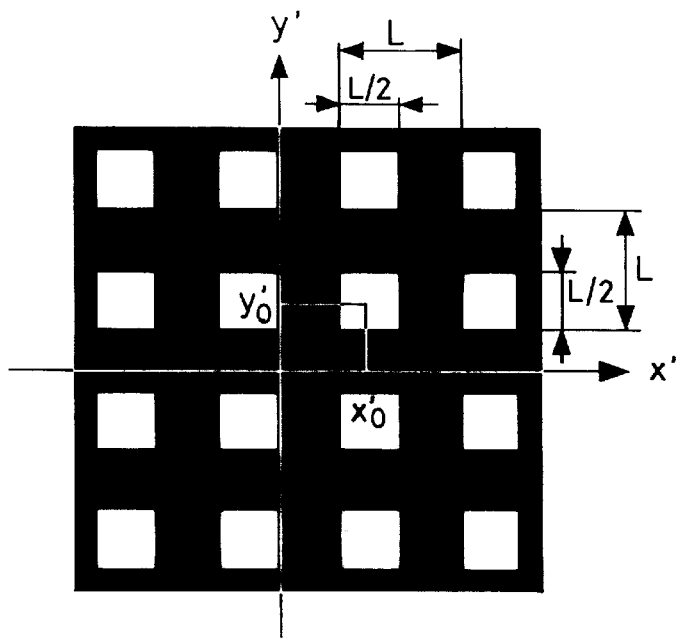
FIGS. 7(a) and 7(b) are diagrams showing the transmittance distribution of a two-dimensional diffraction grating in the third embodiment and Fourier components thereof.
Figure 7B:
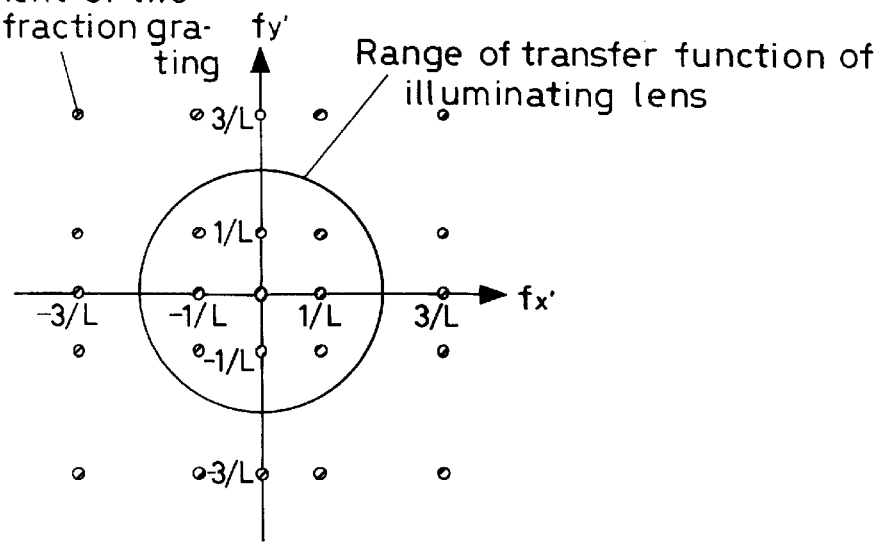

FIG. 6 shows the arrangement of an optical system for carrying out an image-forming method according to a third embodiment of the present invention. As shown in the figure, the optical system includes a two-dimensional diffraction grating 26 that is illuminated with incoherent light 25. The two-dimensional diffraction grating 26 is movable in a plane perpendicular to an optical axis. An illuminating optical system 27 projects an image of the two-dimensional diffraction grating 26 onto an observation object O. An image-forming optical system 3 projects an enlarged image of the observation object O. An image pickup device 22 detects the image of the observation object O formed by the image-forming optical system 3. As shown in FIG. 7(a), the two-dimensional diffraction grating 26 is a rectangular amplitude grating with a period L with respect to axes x' and y' that perpendicularly intersect the optical axis. The two-dimensional diffraction grating 26 has square openings arranged at a period L in each of the directions x' and y'. Each side of the square opening is $L/2$ long. The illuminating optical system 27 projects an image of the two-dimensional diffraction grating 26 onto the observation object O at a magnification $\beta$. As shown in FIG. 7(b), Fourier components of the two-dimensional diffraction grating 26 are discretely dispersed with respect to spatial frequencies $f_{x'}$ and $f_{y'}$ in the directions of the x'- and y'-axes, one at the origin and others at the positions of $f_{x'}$, $f_{y'}=(2n+1)/L$ (n is an integer). The cutoff frequency determined by the transfer function of the illuminating optical system 27 on the two-dimensional diffraction grating side thereof is within the range of from $\sqrt{2}/L$ to less than $3/L$. In the image of the two-dimensional diffraction grating 26 on the observation object O, only Fourier components at 9 points in the range of $|f_{x'}|, |f_{y'}|\leq 1/L$ contribute to the image formation. Therefore, a sinusoidal intensity distribution is produced. In this embodiment, the relationship between the cutoff frequency $f_{cutoff}$ of the image-forming optical system 3 and the period L is given by $\beta L f_{cutoff}=1$.

When the center of the two-dimensional diffraction grating 26 is at the position $(x_0', y_0')$ relative to the optical axis, spatial modulation by the illuminating light is expressed by $$\begin{aligned}M(x,y) &= \{\frac{1}{2}+c_x\cos(2\,\pi f_0 x+\phi_x)/2\}\times\{\frac{1}{2}+c_y\cos(2\,\pi f_0 y+\phi_y)/2\}\\ &=\frac{1}{4}\\ &\quad +c_x/8\times\exp(j\,\phi_x)\exp(j2\,\pi f_0 x)\}\\ &\quad +c_x/8\times\{\exp(-j\,\phi_x)\exp(-j2\,\pi f_0 x\}\\ &\quad +c_y/8\times\{\exp(j\,\phi_y)\exp(j2\,\pi f_0 y)\}\\ &\quad +c_y/8\times\{\exp(-j\,\phi_y)\exp(-j2\,\pi f_0 y)\}\\ &\quad +c_x c_y/16\times[\exp\{j(\phi_x+\phi_y)\}\times\exp\{j2\,\pi f_0(x+y)\}]\\ &\quad +c_x c_y/16\times[\exp\{j(\phi_x-\phi_y)\}\times\exp\{j2\,\pi f_0(x-y)\}]\\ &\quad +c_x c_y/16\times[\exp\{-j(\phi_x+\phi_y)\}\times\exp\{-j2\,\pi f_0(x+y)\}]\\ &\quad +c_x c_y/16\times[\exp\{-j(\phi_x-\phi_y)\}\times\exp\{-j2\,\pi f_0(x-y)\}]\end{aligned} \quad (11)$$

where $f_0=1/\beta L$;

$\phi_x=2\pi x_0'/L$;

$\phi_y=2\pi y_0'/L$;

$c_x$ and $c_y$ are constants expressing the contrast of illuminating light.

At this time, the modulated image $I(x,y)$ of the observation object O is expressed by a two-dimensionally expanded form of equation (3) as follows:

$$\begin{aligned}I(x,y) &= \frac{1}{4}\times O(x,y)^*P(x,y)\\ &\quad +c_x/8\times\{\exp(j\,\phi_x)\exp(j2\,\pi f_0 x)\}\times\{O(x,y)^*P_{-0}(x,y)\}\\ &\quad +c_x/8\times\{\exp(-j\,\phi_x)\exp(-j\,2\,\pi f_0 x)\}\times\{O(x,y)^*P_{+0}(x,y)\}\\ &\quad +c_y/8\times\{\exp(j\,\phi_y)\exp(j2\,\pi f_0 y)\}\times\{O(x,y)^*P_{0-}(x,y)\}\\ &\quad +c_y/8\times\{\exp(-j\,\phi_y)\exp(-j\,2\,\pi f_0 y)\}\times\{O(x,y)^*P_{0+}(x,y)\}\\ &\quad +c_x c_y/16\times[\exp\{j(\phi_x+\phi_y)\}\times\exp\{j2\,\pi f_0(x+y)\}]\times\{O(x,y)^*P_{--}(x,y)\}\\ &\quad +c_x c_y/16\times[\exp\{-j(\phi_x+\phi_y)\}\times\exp\{-j2\,\pi f_0(x+y)\}]\times\{O(x,y)^*P_{++}(x,y)\}\\ &\quad +c_x c_y/16\times[\exp\{j(\phi_x-\phi_y)\}\times\exp\{j2\,\pi f_0(x-y)\}]\times\{O(x,y)^*P_{-+}(x,y)\}\\ &\quad +c_x c_y/16\times[\exp\{-u(\phi_x-\phi_y)\}\times\exp\{-j2\,\pi f_0(x-y)\}]\times\{O(x,y)^*P_{+-}(x,y)\}\end{aligned} \quad (12)$$

where $O(x,y)$ is the transmittance distribution of the observation object;

$P(x,y)$ is the point spread function of the image-forming optical system; and $P_{sx,sy}(x,y)\equiv P(x,y)\exp\{j2\,\pi_0(s_x x+s_y y)\}$ ($s_x$ and $s_y$ represent the sign + or − or 0)

If $I(x,y)$ is obtained for 9 combinations of $\phi_x$ and $\phi_y$ by moving the diffraction grating 26 in the directions of the x'- and y'-axes, 9 demodulated image components $O(x,y)^*P(x,y)$ and $O(x,y)^*P_{+-,+-}(x,y)$ can be extracted independently by linear computation of $I(x,y)$ thus obtained. By adding together the demodulated image components, a restored image is obtained.

Figure 8A:
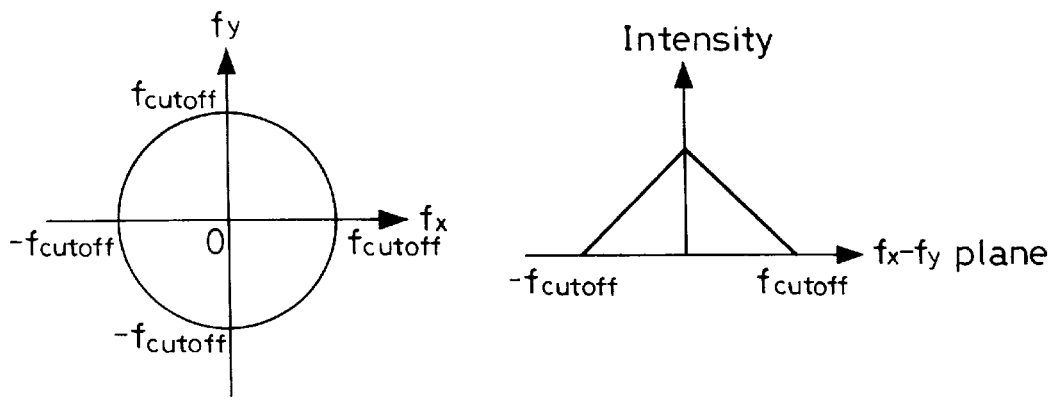
FIGS. 8(a) and 8(b) are diagrams showing the transfer function of an image-forming optical system in the third embodiment and the transfer function for a reconstructed image.
Figure 8B:
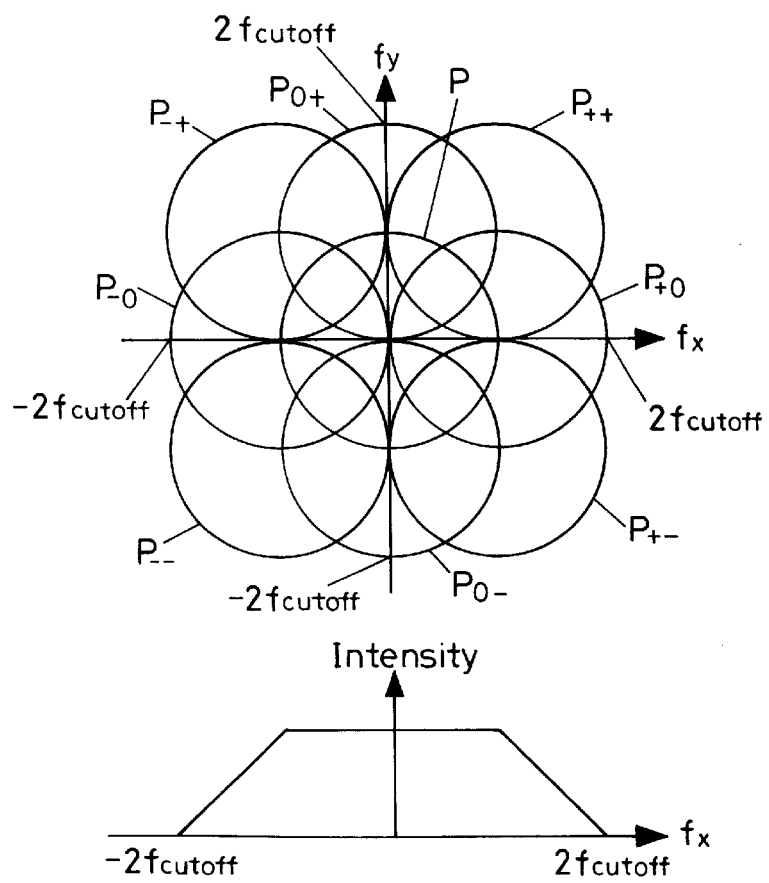

As shown in FIG. 8(a), the image-forming optical system 3 in this embodiment can transfer information only in the spatial frequency region $|f|<f_{cutoff}$ [in part (a) of FIG. 8, the left diagram is a bird's-eye view of the spatial frequency distribution, and the right diagram is a sectional view thereof]. Because the period L of the diffraction grating 26 is set at $\beta L f_{cutoff}=1$, the transfer function corresponding to the restored image $I_r(x,y)$ is superposition of the transfer function of the image-forming optical system 3 that is centered at the origin and at $(\pm f_{cutoff}, \pm f_{cutoff})$ as shown in FIG. 8(b) [in FIG. 8(b), the upper diagram is a bird's-eye view of the transfer function, and the lower diagram is a section view thereof]. The restored image in the spatial frequency region extends over as far as $\pm 2 f_{cutoff}$ in both the directions x and y. Therefore, the restored image is equal to an observation image formed by an image-forming system having a cutoff frequency double the transfer function of the image-forming optical system 3. Accordingly, the restored image exhibits superresolution.

In this embodiment, even higher superresolution can be realized by setting L in the range of $1<\beta L f_{cutoff}<1.4$. In this case, however, the transfer function for the restored image shows an uneven intensity distribution in a low spatial frequency region. Therefore, it is desirable to add spatial frequency filtering to correct the uneven intensity distribution. If $\beta L f_{cutoff}$ is set at 1.4 or more, an intermediate frequency component is undesirably omitted, and this cannot be restored by spatial frequency filtering. Therefore, it is undesirable to set $\beta L f_{cutoff}$ at 1.4 or more.

Figure 9:
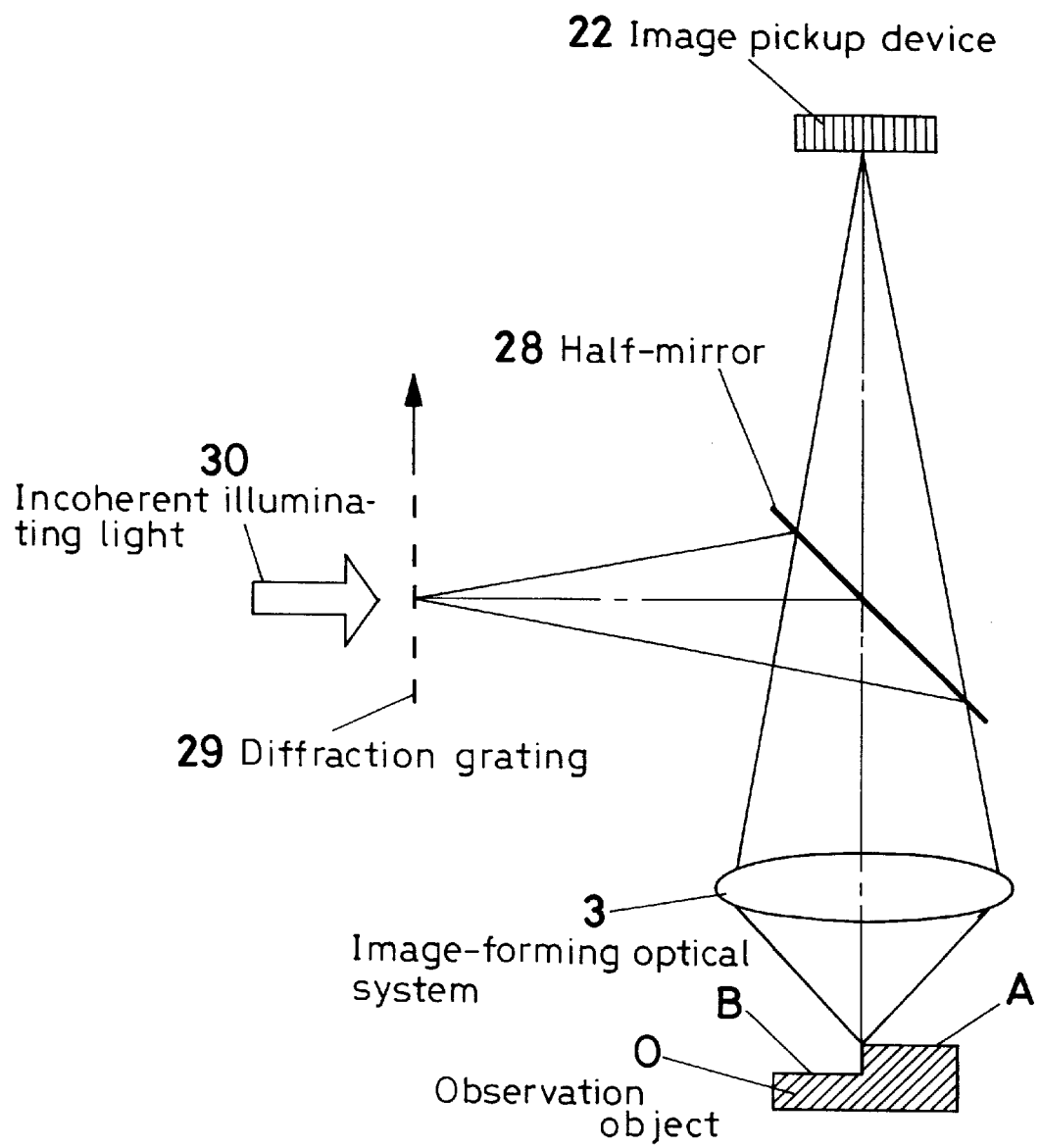
FIG. 9 is a diagram showing the arrangement of an optical system for carrying out an image-forming method according to a fourth embodiment of the present invention.

FIG. 9 shows the arrangement of an optical system for carrying out an image-forming method according to a fourth embodiment of the present invention. As shown in the figure, the optical system includes an image-forming optical system 3 that projects an enlarged image of an observation object O, which is a reflective object with a step. An image pickup device 22 detects the image of the observation object O formed by the image-forming optical system 3. A half-mirror 28 is placed between the image-forming optical system 3 and the image pickup device 22. A diffraction grating 29 is placed at a position conjugate to the observation object O via the half-mirror 28. The diffraction grating 29 is movable in a plane perpendicular to an optical axis. The diffraction grating 29 is illuminated with incoherent light 30 that is applied toward the observation object O. As shown in FIG. 2, the diffraction grating 29 is a rectangular amplitude grating with a period L. The diffraction grating 29 has transparent and non-transparent portions alternately disposed thereon. Each of the transparent and non-transparent portions has a width of L/2. The image-forming optical system 3 projects an image of the diffraction grating 29 onto the observation object O at a magnification $\beta$. In this embodiment, the relationship between the cutoff frequency $f_{cutoff}$ of the image-forming optical system 3 on the observation object side thereof and the period L of the diffraction grating 29 is expressed by $\beta L f_{cutoff}=2$. The image of the diffraction grating 29 is projected with a sinusoidal intensity distribution at the in-focus position of the image-forming optical system 3.

As shown in FIG. 9, the observation object O has a surface A at the in-focus position of the image-forming optical system 3 and further has a surface B at a non-in-focus position away from the surface A more than the depth of focus of the image-forming optical system 3. The image of the diffraction grating 29 is formed on the surface A. Thus, the surface A is illuminated with light having a sinusoidal intensity distribution. On the other hand, the surface B is illuminated with light close to spatially uniform illuminating light because the position of the surface B is out of the focal depth of the image of the diffraction grating 29.

When the center of the diffraction grating 29 is at a position $(x_0', y_0')$ apart from the optical axis, spatial modulation by the illuminating light is expressed by $$M(x) = \frac{1}{2} + c/2 \times \cos(2\pi f_0 x + \phi) = \frac{1}{2} + c/4 \times \{\exp(j\phi)\exp(j2\pi f_0 x) + \exp(-j\phi)\exp(-j2\pi f_0 x)\} \quad (13)$$

In the above equation, $f_0 = 1/\beta L$ and $\phi = 2\pi x_0/L$. The constant c expressing the contrast of the illuminating light is about ½ on the surface A and approximately zero on the surface B. At this time, the modulated image I(x) of the observation object O is expressed according to equation (3) as follows:

$$I(x) = \frac{1}{2} \times O(x)^*P(x) + c/4 \times \exp(j\phi)\exp(j2\pi f_0 x) \times \{O(x)^*P_-(x)\} + c/4 \times \exp(-j\phi)\exp(-j2\pi f_0 x) \times \{O(x)^*P_+(x)\} \quad (14)$$

where $$P_s(x) \equiv P(x)\exp(sj2\pi f_0 x)$$

(s represents the sign + or −)

If modulated images I(x) for three $\phi$ are obtained by moving the diffraction grating 29, demodulated image components $O(x)^*P(x)$ and $O(x)^*P_{+,-}(x)$ can be extracted independently by linear computation of I(x) thus obtained. In this embodiment, modulated images corresponding to $\phi=0$, $\phi=2\pi/3$, and $\phi=-2\pi/3$ are denoted by $I_1(x)$, $I_2(x)$, and $I_3(x)$, respectively. Accordingly, each demodulated image component can be calculated as follows:

$$O(x)^*P(x) = \frac{2}{3} \times (I_1 + I_2 + I_3)$$

$$O(x)^*P_-(x) = 2/(3c) \times \{2I_1 - (1+j\sqrt{3})I_2 - (1-j\sqrt{3})I_3\}\exp(-j2\pi f_0 x)$$

$$O(x)^*P_+(x) = \{O(x)^*P_-(x)\}^* \quad (15)$$

It should be noted that { }* in the above equation represents complex conjugate.

In this embodiment, the light-cut image $I_c$ is given as follows:

$$I_c(x) \equiv c\{O(x)^*P_-(x) + O(x)^*P_+(x)\} = 4/3 \times \{(2I_1 - I_2 - I_3)\cos(2\pi f_0 x) - \sqrt{3}(I_2 - I_3)\sin(2\pi f_0 x)\} \quad (16)$$

The light-cut image $I_c$ is proportional to the contrast c of the illuminating light and hence zero with respect to an observation object O at a position out of the focal depth of the image of the diffraction grating 29. Accordingly, the light-cut image of the surface A is bright, whereas the light-cut image of the surface B is dark. Consequently, a light-cut effect whereby the surface A and the surface B are separated from each other is obtained.

Figure 10:
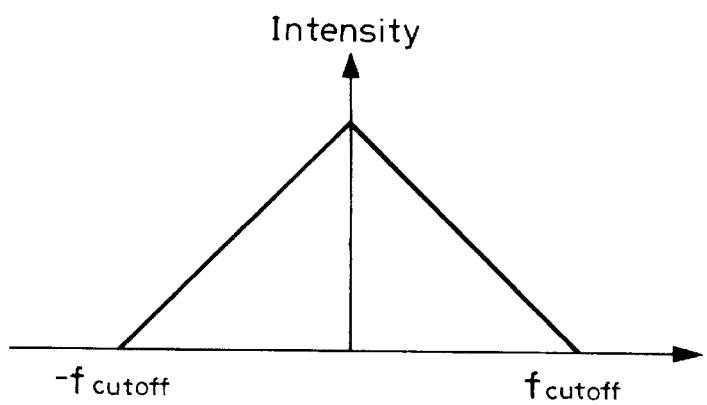
FIGS. 10(a) and 10(b) are diagrams showing the transfer function of an image-forming optical system in the fourth embodiment and the transfer function for a light-cut image.
Figure 10:
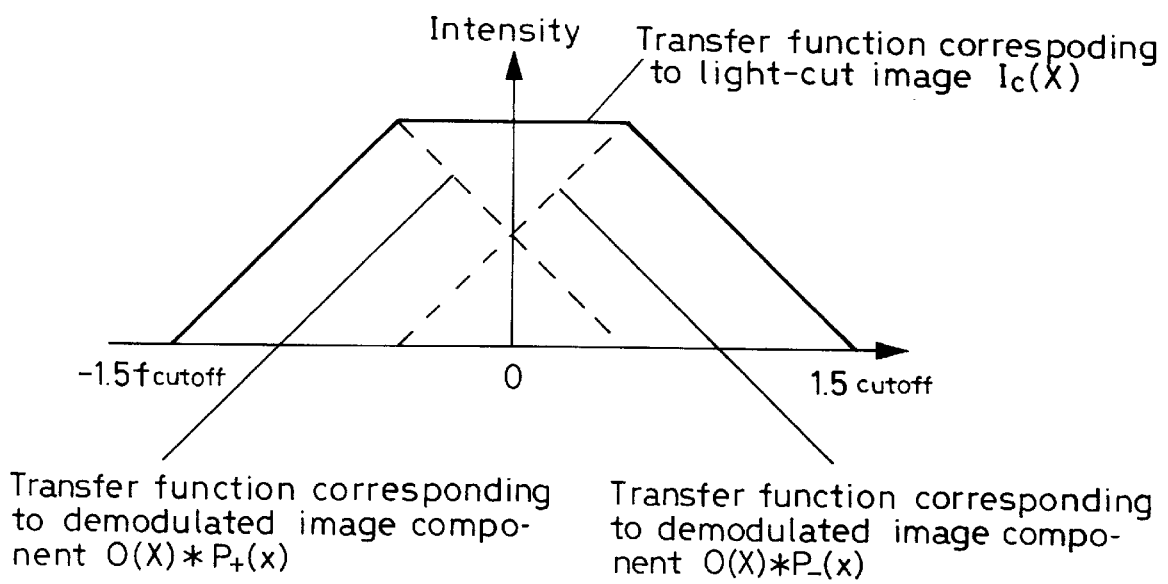

As shown in FIG. 10(a), the image-forming optical system 3 in this embodiment can transfer information only in the spatial frequency region of $-f_{cutoff} < f < f_{cutoff}$. However, as shown in FIG. 10(b), the light-cut image $I_c(x)$ is equal to an observation image formed by an image-forming system having a cut-off frequency 1.5 times as large as the transfer function of the image-forming optical system 3, and it also exhibits superresolution.

Furthermore, by selecting the period L of the diffraction grating 29 and the magnification $\beta$, at which the diffraction grating 29 is projected by the image-forming optical system 3, within the range of $1/\beta L < f_{cutoff} < 2/\beta L$, it is possible to obtain superresolution having a cutoff frequency 2 times as large as the transfer function of the image-forming optical system 3 at the maximum. In this case, however, a depression is produced in the neighborhood of the spatial frequency 0. Therefore, it is desirable to jointly use a modulation filter such as that described in the third embodiment.

Thus, according to this embodiment, a light-cut image can be calculated by performing only linear computation of the detected image intensities as shown by equation (16). Therefore, it becomes possible to realize real-time super-resolution light-cut image observation.

Figure 21:
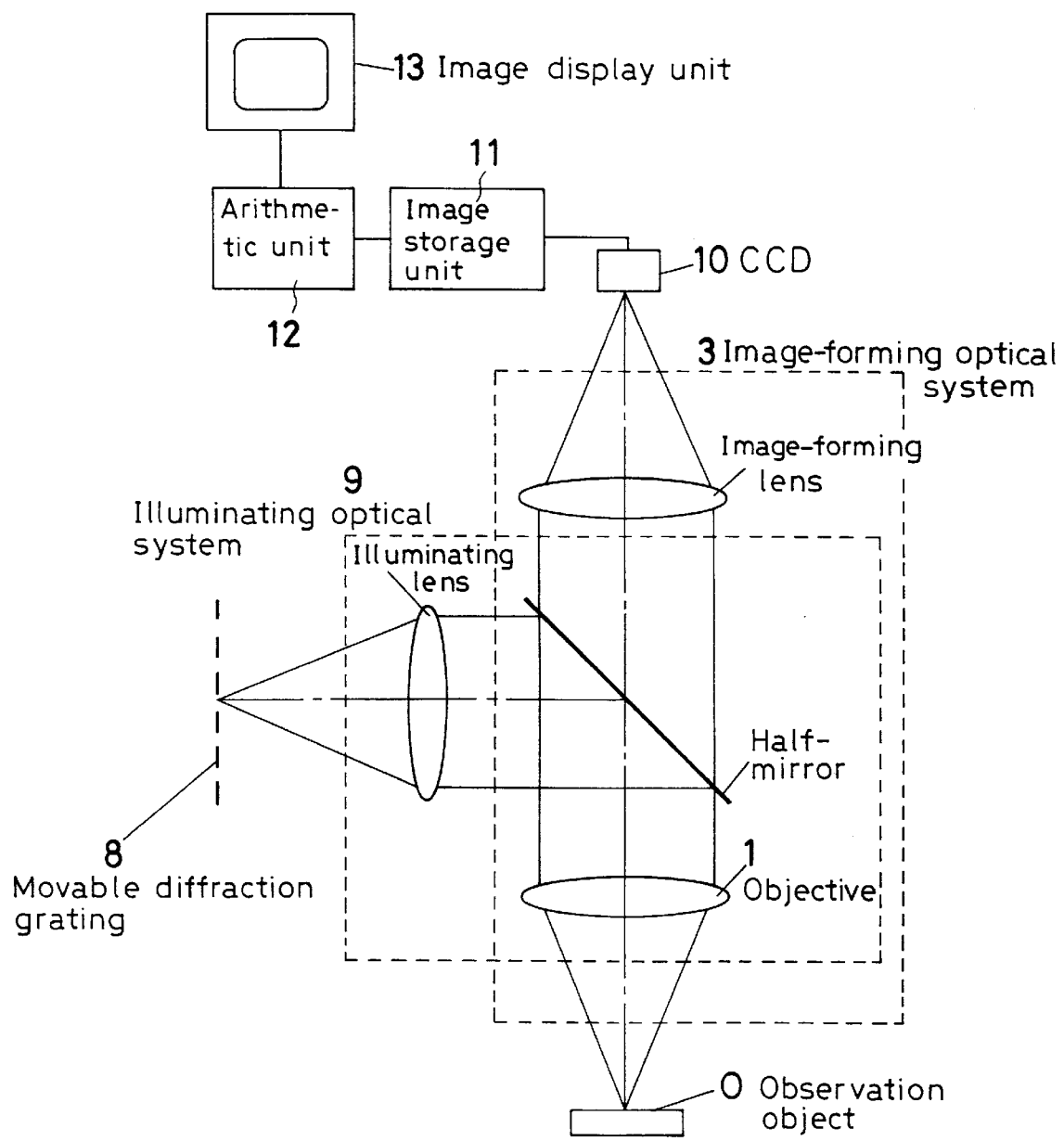
FIG. 21 is a diagram for describing a conventional fringe projection light-cut microscope system.

Regarding the arrangement of a system for carrying out the image-forming method according to the present invention, any of the foregoing embodiments may employ an arrangement similar to that shown in FIG. 21 by way of example. That is, the system is provided with an image storage unit 11 for storing the modulated images of the observation object O detected by the image pickup device 22. The system is further provided with an arithmetic unit 12 for performing an arithmetic operation using the images stored in the image storage unit 11 and an image display unit 13 for displaying the result of the arithmetic operation performed by the arithmetic unit 12. In the case of the first, third and fourth embodiments, for example, the system is provided with a moving mechanism for moving the diffraction grating 21, 26 or 29. In the case of the second embodiment, the system is provided with a device for varying the phase difference between the two illuminating light beams 24, e.g. a light modulator. The system is arranged to allow the arithmetic unit 12 to perform the arithmetic operation shown in FIG. 11 while supplying the image storage unit 11 or the arithmetic unit 12 with information concerning the movement of the diffraction grating from the moving mechanism or phase difference information from the light modulator.

Figure 13:
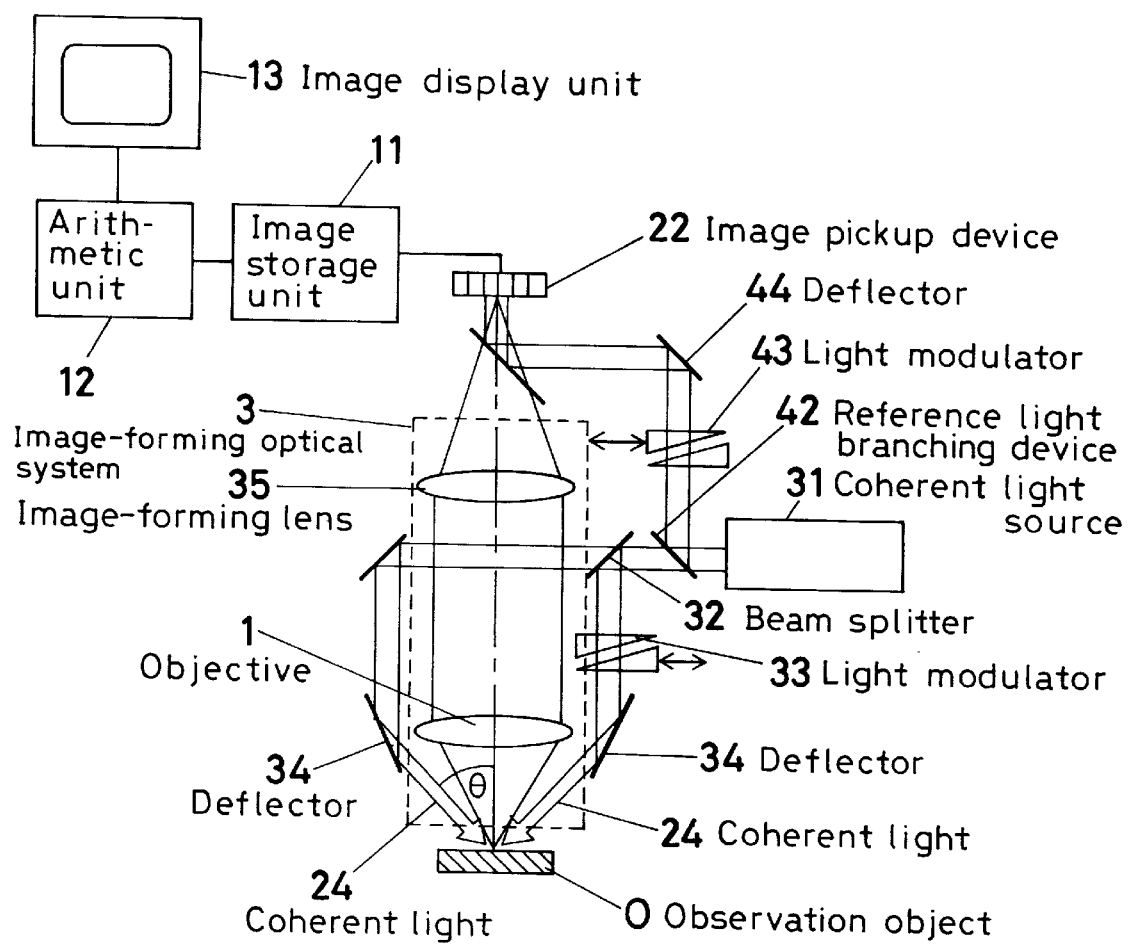
FIG. 13 is a diagram showing the arrangement of an optical system of an image-forming apparatus according to a fifth embodiment the present invention.

FIG. 13 shows an optical system that constitutes an image-forming apparatus according to a fifth embodiment of the present invention. As shown in the figure, the optical system includes a coherent light source 31. A reference light branching device 42 branches reference light from coherent illuminating light emitted from the coherent light source 31. A light modulator 43 varies the phase of the reference light. A deflector 44 deflects the reference light. A beam splitter 32 splits the illuminating light into a plurality of illuminating light beams, for example, two illuminating light beams. A light modulator 33 modulates the phase of at least one of the illuminating light beams relative to the other illuminating light beam. Deflectors 34 deflect the illuminating light beams. An image-forming optical system 3 includes an objective 1 for projecting an enlarged image of an observation object O, and an image-forming lens 35. An image pickup device 22 detects a modulated image of the observation object O formed by the image-forming optical system 3. An image storage unit 11 stores the modulated image of the observation object O detected by the image pickup device 22. An arithmetic unit 12 performs an arithmetic operation using the images stored in the image storage unit 11. An image display unit 13 displays the result of the arithmetic operation performed by the arithmetic unit 12. Although not shown in the figure, the optical system further has a device for supplying phase difference information from the light modulator 33 to the arithmetic unit 12.

As the coherent light source 31, for example, a helium-neon laser may be used. As the beam splitter 32 and the reference light branching device 42, for example, half-mirrors may be used. As the deflectors 34 and 44, for example, mirrors or half-mirrors may be used. As the light modulators 33 and 43, for example, a combination of two wedge-shaped prisms of the same configuration may be used. The two wedge-shaped prisms are placed opposite each other in a staggered configuration. One of the prisms is arranged to be movable by a moving mechanism (not shown) in a direction perpendicular to the optical axis of the illuminating light.

Coherent light emitted from the coherent light source 31 is first incident on the reference light branching device 42. The incident light is split into illuminating light and reference light by the reference light branching device 42. The illuminating light is split into two illuminating light beams by the beam splitter 32. One illuminating light beam is given a phase difference relative to the other illuminating light beam according to the amount of movement of the movable wedge-shaped prism, which constitutes the light modulator 33. Thereafter, the propagation direction of the illuminating light beam is changed by the deflector 34. Then, the illuminating light beam is incident on a sample (observation object O) at an angle θ from the outside of the objective 1. It should be noted that the amount of movement of the wedge-shaped prism is supplied to the arithmetic unit 12. The other illuminating light beam is incident on the deflector 34. After the propagation direction thereof has been changed by the deflectors 34, the illuminating light beam is incident on the sample (observation object O) at an angle θ from the outside of the objective 1. On the observation object 0, interference fringes are formed by the two obliquely incident illuminating light beams, which are coherent light. The intensity of the illuminating light applied to the observation object is spatially modulated by the interference fringes. At this time, the phase difference of one illuminating light beam relative to the other illuminating light beam can be varied by moving the movable wedge-shaped prism. Consequently, the interference fringes move on the observation object.

Meanwhile, the reference light, which is branched from the coherent light emitted from the coherent light source 31 by the reference light branching device 42, passes through the light modulator 43 and is then deflected by the deflector 44 to enter the image pickup device 22. It should be noted that it is possible to choose whether or not to allow the reference light to be incident on the image pickup device 22 by inserting the reference light branching device 42 into the illuminating light path or withdrawing it from the path through a moving mechanism (not shown).

When the reference light is incident on the image pickup device 22, interference fringes are formed by interference between the reference light and the modulated image of the observation object O formed on the image pickup device 22. The interference fringes are recorded onto the image storage unit 11. The phase of the reference light is varied by the light modulator 43 to take in a plurality of interference fringe patterns, thereby carrying out phase shift measurement. By doing so, the phase distribution of the observation object O can be measured. The method of calculating a phase distribution from the result of the phase shift measurement is a publicly known technique. Therefore, a description thereof is omitted.

When the reference light is not made incident on the image pickup device 22, only the modulated image of the observation object O is incident on the image pickup device 22. Consequently, the intensity distribution can be measured.

The complex amplitude distribution of the image can be obtained by performing an arithmetic operation in the arithmetic unit 12 on the basis of the result of measurement of the phase distribution and the result of measurement of the intensity distribution.

The equation expressing the spatial modulation by the obliquely incident illuminating light beams and the equations expressing the modulated image and the restored image in this embodiment are the same as those described in the second embodiment. Therefore, a description thereof is omitted. A complex amplitude distribution is obtained for each modulation condition given to the observation object O, more specifically, for each position of interference fringes, and an arithmetic operation is performed in the arithmetic unit 12 using the complex amplitude distributions thus obtained to obtain a restored image, which is then displayed on the image display unit 13.

Figure 14A:
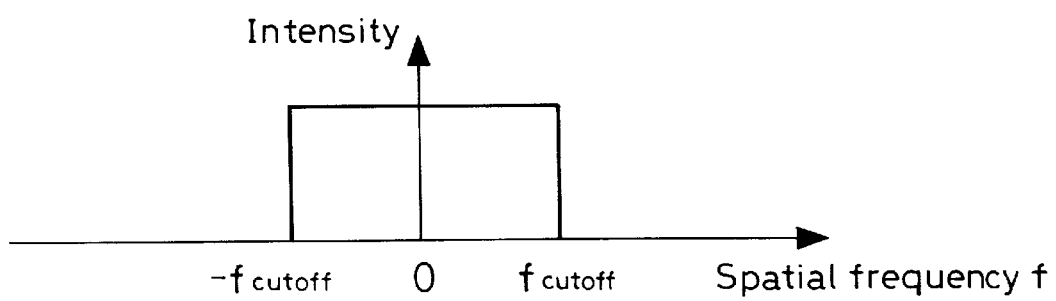
FIGS. 14(a) and 14(b) are diagrams showing the transfer function of an image-forming optical system in the fifth embodiment and the transfer function for a reconstructed image.
Figure 14B:
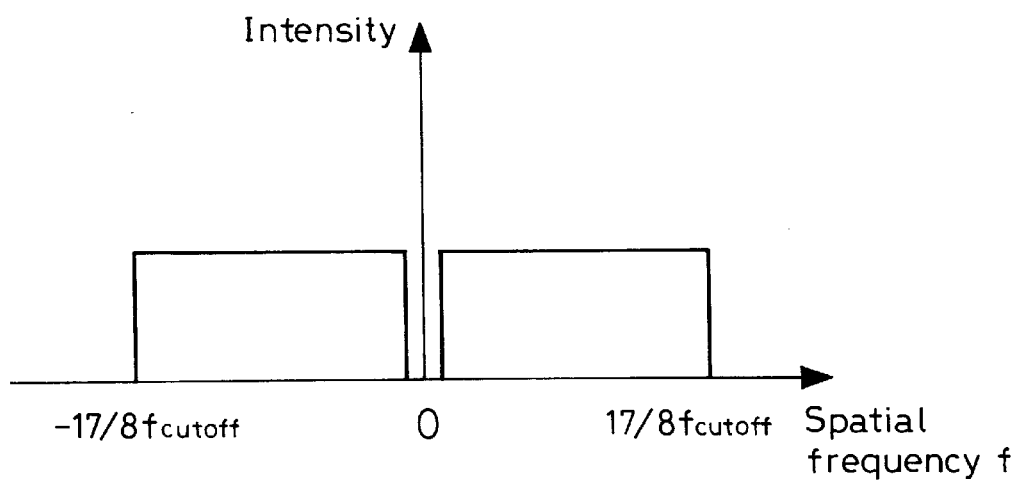

In this embodiment, when the objective 1 has an NA of 0.8 and the incident angle of the illuminating light is θ=64 degrees, the spatial frequency of interference fringes formed on the sample is $f_0=(9/8)f_{cutoff}$. At this time, the transfer function of the image-forming optical system 3 is as shown in FIG. 14(a). As shown in FIG. 14(b), the transfer function for the reconstructed image is equal to that for an observation image formed by an image-forming system having a cutoff frequency larger than the transfer function of the image-forming optical system 3. Thus, the reconstructed image exhibits superresolution.

However, information in a low-frequency region cannot be obtained because of a dead region therein. This gives rise to no problem in use applications where information in the low-frequency region is not important, for example, in the measurement of a fine structure on a flat substrate. However, when it is desired to obtain also information in the low-frequency region, a modulated image including information in the low-frequency region is obtained by the image-forming method described in the fourth embodiment, for example, and the modulated image is combined with the result obtained in this embodiment. By doing so, the modulated image can be corrected for the effect of the dead region in the low-frequency region.

Although in the foregoing description, a helium-neon laser is used as an example of the coherent light source 31, the present invention is not necessarily limited thereto. Other lasers, for example, a helium-cadmium laser or an argon ion laser, may also be used.

Although in the foregoing description half-mirrors are used as the beam splitter 32 and the reference light branching device 42, the present invention is not necessarily limited thereto. Other devices, for example, an optical fiber bundle or a cube beam splitter, may also be used.

Although in the foregoing description, a combination of a pair of wedge-shaped prisms placed in the optical system and a prism moving mechanism (not shown) is used as each of the light modulators 33 and 43, it is also possible to use other devices, for example, a combination of a mirror, to which illuminating light is incident, and a mechanism for finely moving the mirror in the optical axis direction.

Although in this embodiment the present invention is applied to a surface configuration measuring system, the present invention is not necessarily limited thereto. For example, the present invention can be applied to a defect inspection system in which a reference pattern is held in the arithmetic unit 12, and a reconstructed image of an observation object O is compared with the reference pattern to detect a difference therebetween as a defect. In this case, if a predetermined criterion of judgement is provided, the system can be used as a pass/fail checking system. Examples of the reference pattern usable in the present invention include data concerning the design of an observation object and data based on the result of measurement of a defect-free sample by an SEM (Scanning Electron Microscope).

The above-described image-forming apparatus may be arranged such that reference position information is held in the arithmetic unit 12, and an observation object moving mechanism is provided to move the observation object O on the basis of information from the arithmetic unit 12. By doing so, the image-forming apparatus can be used as a positioning system in which a difference between an image obtained by the above-described image-forming apparatus and the reference position information is calculated, and information is sent to the observation object moving mechanism according to the calculated difference, thereby enabling the observation object O to coincide with the reference position with high accuracy.

The above-described image-forming apparatus may also be arranged such that the same observation object O is measured at different times, and a plurality of modulated images or restored images are taken into the arithmetic unit 12 to calculate a displacement of the observation object O from the modulated or restored images. With this arrangement, the image-forming apparatus can be applied to a displacement measuring system.

Alternatively, the above-described image-forming apparatus may be provided with a moving mechanism for moving the observation object O in the optical axis direction to use the image-forming apparatus as a three-dimensional configuration measuring system. That is, the observation object O is measured in a plurality of different conditions by varying the distance between the observation object O and the image-forming optical system 3 in the optical axis direction, thereby capturing a plurality of modulated images or restored images, and the three-dimensional configuration of the observation object O is calculated from the modulated or restored images.

Figure 15:
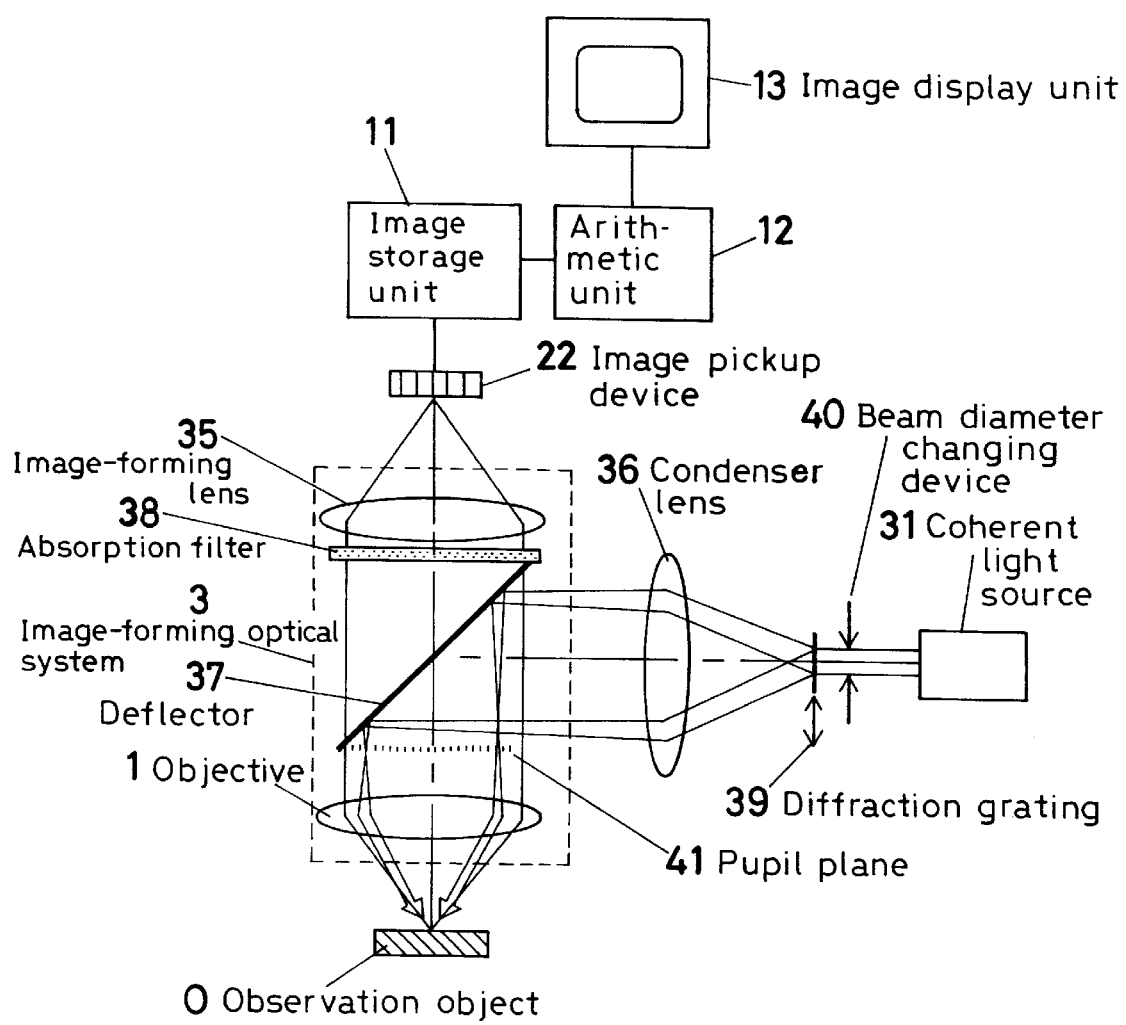
FIG. 15 is a diagram showing the arrangement of an optical system of an image-forming apparatus according to a sixth embodiment of the present invention.

Next, a sixth embodiment of the present invention will be described. In this embodiment, the image-forming apparatus according to the present invention is applied to a fluorescence observation apparatus. As shown in FIG. 15, an optical system constituting the fluorescence observation apparatus includes a coherent light source 31. A beam diameter changing device 40 changes the beam diameter of illuminating light emitted from the coherent light source 31. A beam splitter splits the illuminating light into a plurality of illuminating light beams, for example, two illuminating light beams. A light modulator modulates the phase of at least one of the illuminating light beams relative to the other illuminating light beam. A condenser lens 36 concentrates the illuminating light beams on the pupil position of an objective 1. A deflector 37 deflects the illuminating light beams. An image-forming optical system 3 has the objective 1 and an image-forming lens 35 to project an enlarged image of an observation object O. An absorption filter 38 absorbs light rays of wavelength λ. An image pickup device 22 detects a modulated image of the observation object O formed by the image-forming optical system 3. An image storage unit 11 stores the modulated image of the observation object O detected by the image pickup device 22. An arithmetic unit 12 performs an arithmetic operation using the images stored in the image storage unit 11. An image display unit 13 displays the result of the arithmetic operation performed by the arithmetic unit 12.

As the coherent light source 31, for example, an argon ion laser (wavelength λ:488 nanometers) may be used. As the beam diameter changing device 40, a stop may be used. As the deflector 37, for example, a dichroic mirror may be used which has wavelength characteristics in which the dichroic mirror reflects light beams in the vicinity of the wavelength of illuminating light, which plays the role of excitation light in fluorescence observation, and transmits light beams in the fluorescence wavelength region.

The observation object O may be a cellular tissue dyed with a fluorescent reagent FITC, for example. FITC has a high fluorescence conversion efficiency in the vicinity of the excitation wavelength of 490 nanometers. The center wavelength of fluorescence is about 520 nanometers.

Illuminating light of wavelength λ=488 nanometers emitted from the coherent light source 31 passes through the beam diameter changing device 40, which limits the beam diameter of the illuminating light so that the illuminating light beam is incident on only a portion of the observation object O that is to be measured. Thereafter, the illuminating light is split into two illuminating light beams by a beam splitter, e.g. a diffraction grating 39. For example, ± first-order diffracted light beams may be used as the two illuminating light beams. Although not shown in the figure, a plate or the like that blocks unwanted diffracted light produced by the diffraction grating 39 may be provided between the beam splitter and the observation object O. When the diffraction grating 39 is used as the beam splitter, the phase of one illuminating light beam relative to the other illuminating light beam can be modulated by moving the diffraction grating 39 in a direction perpendicular to the optical axis. Accordingly, a light modulator can be constructed by combining together a diffraction grating moving mechanism (not shown) and the diffraction grating 39. After passing through the beam splitter, the two illuminating light beams enter the condenser lens 36. Then, the two illuminating light beams are each reflected by the deflector 37, concentrated on a pupil plane 41 of the objective 1 and then incident on the objective 1. The two illuminating light beams are concentrated at different positions in the pupil plane 41 and emanate from the objective 1 in the form of parallel light beams. The illuminating light beams are superimposed on one another in the vicinity of the observation object O, forming interference fringes. At this time, the phase difference of one illuminating light beam relative to the other can be varied by moving the diffraction grating 39. Consequently, the interference fringes move on the observation object O.

As has been stated above, FITC has a high fluorescence conversion efficiency in the vicinity of the wavelength of 490 nanometers. Therefore, the illuminating light beams of wavelength 488 nanometers act as excitation light for fluorescence, and the observation object O emits fluorescence light having a center wavelength of about 520 nanometers. The fluorescence light from the observation object O passes through the objective 1 and further passes through the deflector 37 and the absorption filter 38. Thereafter, the fluorescence light enters the image-forming lens 35 and forms an image on the image pickup device 22. At this time, most of the light of wavelength 488 nanometers from the light source 31, which is unnecessary for fluorescence observation, is reflected by the deflector 37, and the unnecessary light passing through the deflector 37, which is a little in quantity, is absorbed by the absorption filter 38. Accordingly, no light that is unnecessary for fluorescence observation reaches the image pickup device 22.

The equation expressing the spatial modulation by the excitation light is equal to what is obtained by squaring the modulation M(x) expressed by equation (7) in the second embodiment on the assumption that c=1. That is, the spatial modulation by the excitation light is expressed by $$|M(x)|^2 = \tfrac{1}{2} + \tfrac{1}{2} \times \cos\{2\pi(2f_0)x + \phi\} = \tfrac{1}{2} + \tfrac{1}{4} \times [\exp(j\phi)\exp\{j2\pi(2f_0)x\} + \exp(-j\phi)\exp\{-j2\pi(2f_0)x\}] \quad (17)$$

where $f_0 = \sin\theta/\lambda;$ $\phi$ is the phase difference between the two illuminating light beams.

At this time, a modulated image I(x) of the observation object is given according to equation (3) as follows:

$$I(x) = \tfrac{1}{2} \times O(x)^* P(x) + \tfrac{1}{4} \times \exp(j\phi)\exp\{j2\pi(2f_0)x\} \times \{O(x)^* P_-(x)\} + \tfrac{1}{4} \times \exp(-j\phi)\exp\{-j2\pi(2f_0)x\} \times \{O(x)^* P_+(x)\} \quad (18)$$

where $P_s(x) \equiv P(x)\exp(sj2\pi f_0 x)$ (s is the sign + or −)

Accordingly, if modulated images I(x) for three $\phi$ are obtained, demodulated image components $O(x)^*P(x)$ and $O(x)^*P_{+,-}(x)$ can be extracted independently by linear computation of the modulated images thus obtained. For example, assuming that modulated images corresponding to $\phi=0$, $\phi=2\pi/3$, and $\phi=-2\pi/3$ are $I_1(x)$, $I_2(x)$, and $I_3(x)$, respectively, each modulated image component can be calculated as follows:

$$O(x)^*P(x) = \tfrac{2}{3} \times \{I_1 + I_2 + I_3\}$$

$$O(x)^*P_-(x) = \tfrac{2}{3} \times \{2I_1 - (1+j\sqrt{3})I_2 - (1-j\sqrt{3})I_3\}\exp\{-j2\pi(2f_0)x\}$$

$$O(x)^*P_+(x) = \{O(x)^*P_-(x)\}^* \quad (19)$$

It should be noted that $\{\ \}^*$ in the above equation represents complex conjugate.

In this embodiment, a restored image $I_r(x)$ is given as follows:

$$I_r(x) = \tfrac{2}{3} \times [k(I_1+I_2+I_3) + 2(2I_1-I_2-I_3)\cos\{2\pi(2f_0)x\} - 2\sqrt{3}(I_2-I_3)\sin\{2\pi(2f_0)x\}] \quad (20)$$

where k is a parameter by which the modulated image component $O(x)^*P(x)$ is multiplied during the computation.

By changing the value of k, the intensity ratio between the modulated image components is adjusted to obtain a restored image of optimal contrast.

The objective 1 has an NA of 0.95. The angle θ of the illuminating light emanating from the objective 1 with respect to the optical axis is set at 64 degrees.

Figure 16A:
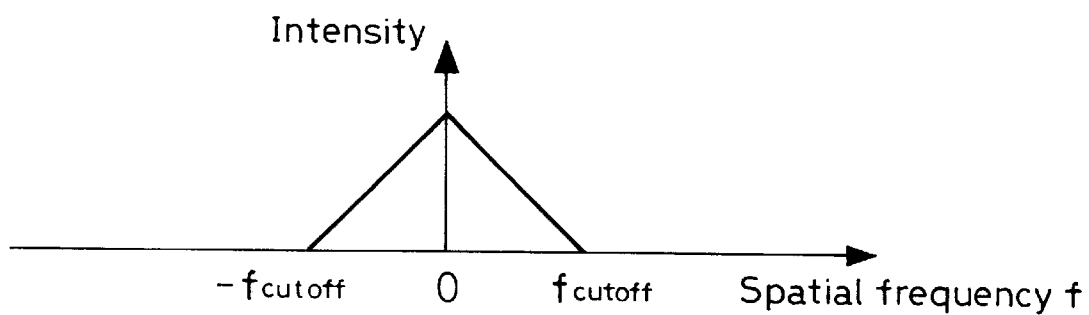
FIGS. 16(a) and 16(b) are diagrams showing the transfer function of an image-forming optical system in the sixth embodiment and the transfer function for a reconstructed image.
Figure 16B:
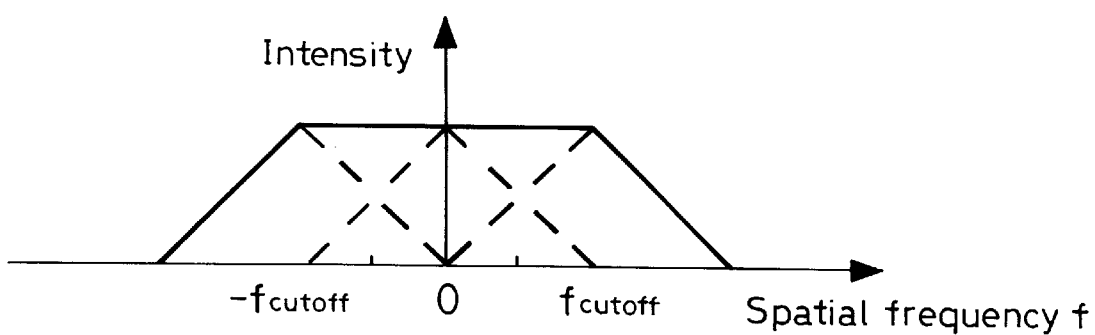

Because fluorescence observation uses incoherent image formation, the image-forming optical system 3 in this embodiment can transfer information only in the spatial frequency region of $-f_{cutoff} < f < f_{cutoff}$, as shown in FIG. 16(a). On the other hand, the period L of the spatial modulation by the excitation light in this embodiment is set at $L=2/f_{cutoff}$. Accordingly, as shown in FIG. 16(b), the restored image $I_r(x)$, which is obtained by adding together all the demodulated image components restored, is equal to an observation image formed by an image-forming system having a cutoff-frequency larger than the transfer function of the image-forming optical system 3, and exhibits superresolution. The figure illustrates a case where k=1.

In fluorescence observation, fluorescence light emitted from a sample is generally very weak. Therefore, an image-forming optical system having a large numerical aperture (NA) is frequently used to collect the fluorescence light to the full. In this case, it is difficult from the viewpoint of the spatial arrangement to employ a method in which illuminating light is applied from the outside of the image-forming optical system as stated in the fifth embodiment. In this embodiment, however, there is no such a difficulty because the illuminating light passes inside the image-forming optical system.

In fluorescence observation, if spontaneous fluorescence occurs in an optical system through which illuminating light passes, an image to be observed may be deteriorated. Therefore, measures are taken to solve the problem. For example, a material that causes minimal spontaneous fluorescence is used for glass or the like that constitutes an optical element. In general, however, it is difficult to eliminate spontaneous fluorescence completely. In this embodiment, the beam diameter of the illuminating light when passing through the objective 1 is small, and the illuminating light passes at a position away from the center of the objective 1. Accordingly, the deterioration of the image due to spontaneous fluorescence occurring from the objective 1 can be reduced to a considerable extent.

Although in the foregoing description an argon ion laser (wavelength λ:488 nanometers) is used as the coherent light source 31, the present invention is not necessarily limited thereto. For example, a green helium-neon laser (λ=543 nanometers), a krypton-argon laser (λ=488 nanometers and 568 nanometers; simultaneous oscillation), etc. may also be used. In such a case, however, it is necessary to use a dichroic mirror having appropriate wavelength characteristics in accordance with the wavelength of a light source used.

Although in the foregoing description FITC is used as a fluorescence reagent, other fluorescence reagents may be used. In such a case, it is necessary to select an appropriate laser from among those mentioned above in accordance with the excitation wavelength of a fluorescence reagent used. Furthermore, in the foregoing description, fluorescence from the observation object O dyed with a fluorescence reagent is observed. However, the image-forming apparatus according to the present invention can also be used as a fluorescence observation apparatus in which spontaneous fluorescence from the observation object O is observed.

Although in the foregoing description the present invention is applied to a fluorescence observation apparatus, the present invention is not necessarily limited thereto. If a half-mirror is used as the deflector 37 and the absorption filter 38 is removed, the image-forming apparatus according to the present invention can also be used as an observation apparatus that obtains an image of the observation object O with light of the same wavelength as the light source.

Figure 17:
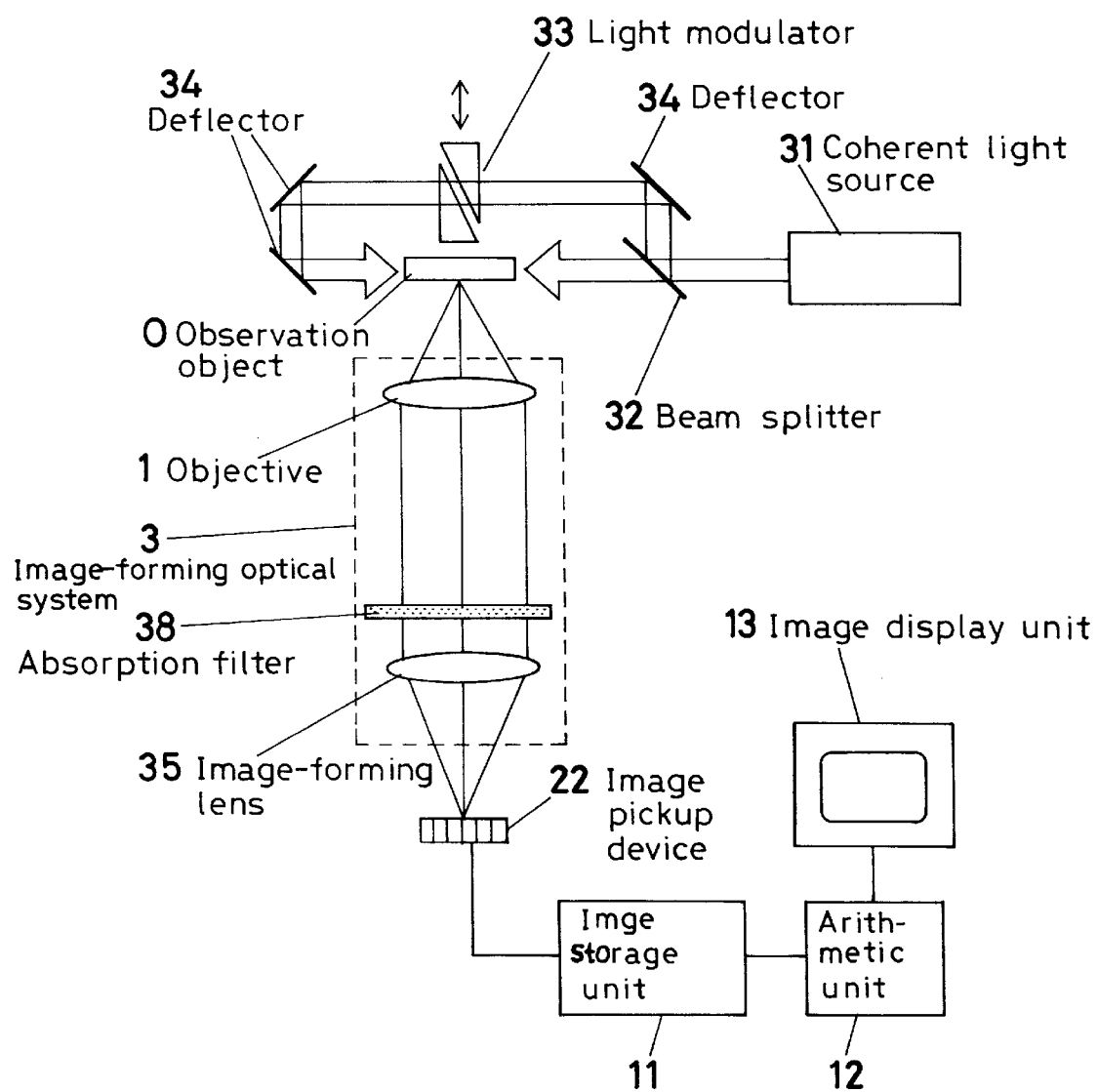
FIG. 17 is a diagram showing the arrangement of an optical system of an image-forming apparatus according to a seventh embodiment of the present invention.

FIG. 17 shows an optical system that constitutes an image-forming apparatus according to a seventh embodiment of the present invention. As shown in the figure, the optical system includes a coherent light source 31. A beam splitter 32 splits illuminating light emitted from the coherent light source 31 into a plurality of illuminating light beams, e.g. two illuminating light beams. A light modulator 33 modulates the phase of at least one of the split illuminating light beams relative to the other illuminating light beam. Deflectors 34 deflect the illuminating light beams. An image-forming optical system 3 has an objective 1 and an image-forming lens 35 to project an enlarged image of an observation object O. An absorption filter 38 absorbs light rays of wavelength A. An image pickup device 22 detects a modulated image of the observation object O formed by the image-forming optical system 3. An image storage unit 11 stores the modulated image of the observation object O detected by the image pickup device 22. An arithmetic unit 12 performs an arithmetic operation using the images stored in the image storage unit 11. An image display unit 13 displays the result of the arithmetic operation performed by the arithmetic unit 12. As the coherent light source 31, for example, an argon ion laser (wavelength λ:488 nanometers) may be used. As the beam splitter 32, for example, a half-mirror may be used. As the deflectors 34, for example, mirrors may be used.

The observation object O is, for example, a cellular tissue dyed with a fluorescence reagent FITC, which is placed on a glass container. The objective 1 has an NA of 0.7 and is corrected for aberrations in view of the thickness of the bottom of the glass container. The two illuminating light beams are incident on the observation object O at an angle of 90 degrees with respect to the optical axis of the image-forming optical system 3. The angle formed between the two illuminating light beams is 128 degrees.

Illuminating light of wavelength 488 nanometers omitted from the coherent light source 31 is split into illuminating light beams by the beam splitter 32. One illuminating light beam passes through the light modulator 33. The two illuminating light beams are deflected by the respective deflectors 34 so as to be incident on the cellular tissue through the glass container, forming interference fringes. As has been stated above, FITC has a high fluorescence conversion efficiency in the vicinity of the wavelength of 490 nanometers. Therefore, the illuminating light beams of wavelength 488 nanometers act as excitation light. Consequently, the observation object O emits fluorescence light having a center wavelength of about 520 nanometers. The fluorescence light emitted from the observation object O passes through the objective 1 and further passes through the absorption filter 38 to enter the image-forming lens 35. Thus, an image of the observation object O is formed on the image pickup device 22. The illuminating light scattered by the observation object O is absorbed by the absorption filter 38. Accordingly, no illuminating light reaches the image pickup device 22.

The equation expressing the spatial modulation by the excitation light is equal to what is obtained by squaring the modulation M(x) expressed by equation (7) in the second embodiment on the assumption that c=1. That is, the spatial modulation by the excitation light is expressed by $$|M(x)|^2 = \tfrac{1}{2} + \tfrac{1}{2}\times\cos\{2\pi(2f_0)x+\phi\} = \tfrac{1}{2} + \tfrac{1}{4}\times[\exp(j\phi)\exp\{j2\pi(2f_0)x\} + \exp(-j\phi)\exp\{-j2\pi(2f_0)x\}] \quad (21)$$

where $f_0 = n\sin(\psi/2)/\lambda$;

φ is the phase difference between the two illuminating light beams;

ψ is the angle formed between the two illuminating light beams;

n is the refractive index of the observation object.

At this time, a modulated image I(x) of the observation object is given according to equation (3) as follows:

$$I(x) = \tfrac{1}{2}\times O(x)*P(x) + \tfrac{1}{4}\times\exp(j\phi)\exp\{j2\pi(2f_0)x\}\times\{O(x)*P_-(x)\} + \tfrac{1}{4}\times\exp(-j\phi)\exp\{-j2\pi(2f_0)x\}\times\{O(x)*P_+(x)\} \quad (22)$$

where $P_s(x) \equiv P(x)\exp(sj2\pi f_0 x)$ (s is the sign + or −)

Accordingly, if modulated images I(x) for three φ are obtained, demodulated image components O(x)*P(x) and O(x)*P$_{+-}$(x) can be extracted independently by linear computation of the modulated images thus obtained. For example, assuming that modulated images corresponding to φ=0, φ=2π/3, and φ=−2π/3 are I$_1$(x), I$_2$(x), and I$_3$(x), respectively, each modulated image component is expressed by equation (19). In that case, the restored image I$_r$(x) in this embodiment is given by equation (20).

Figure 18:
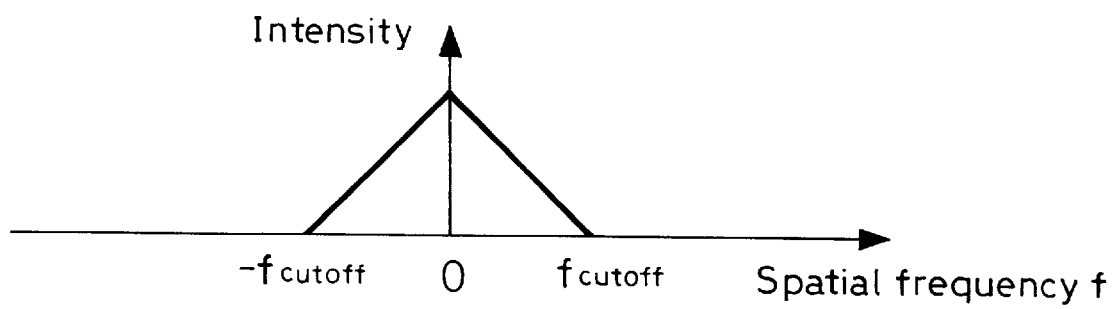
FIGS. 18(a) and 18(b) are diagrams showing the transfer function of an image-forming optical system in the seventh embodiment and the transfer function for a reconstructed image.
Figure 18:
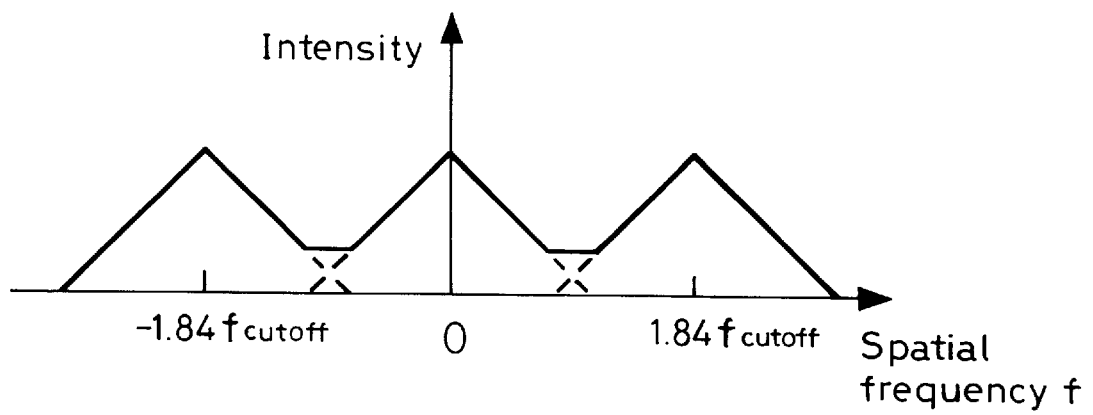
Figure 19:
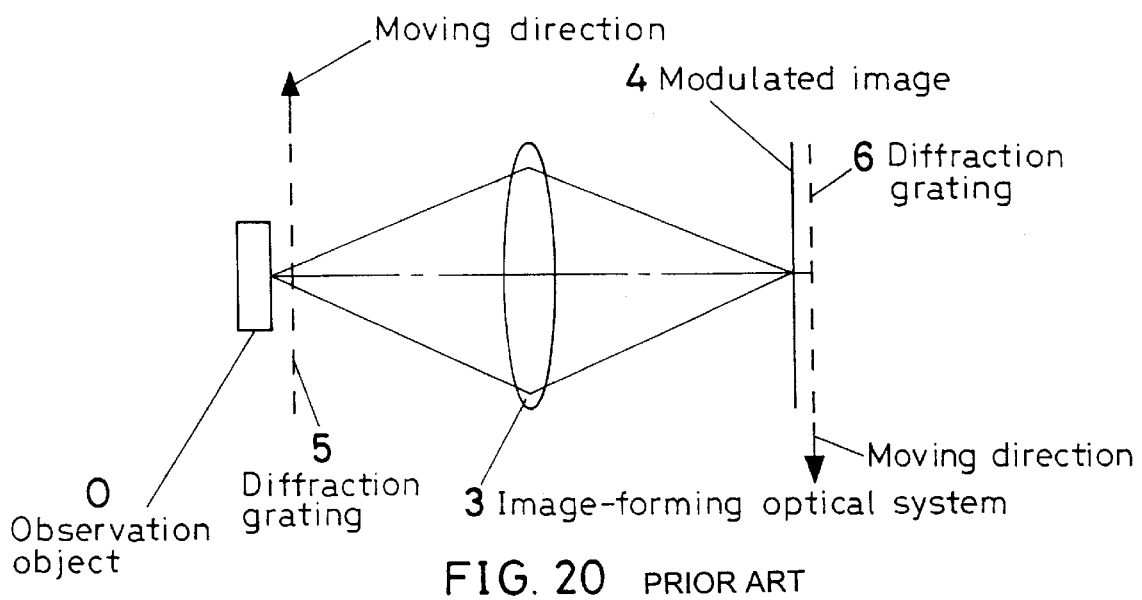
FIG. 19 is a diagram for describing an optical system for carrying out one conventional superresolution method.
Figure 20:
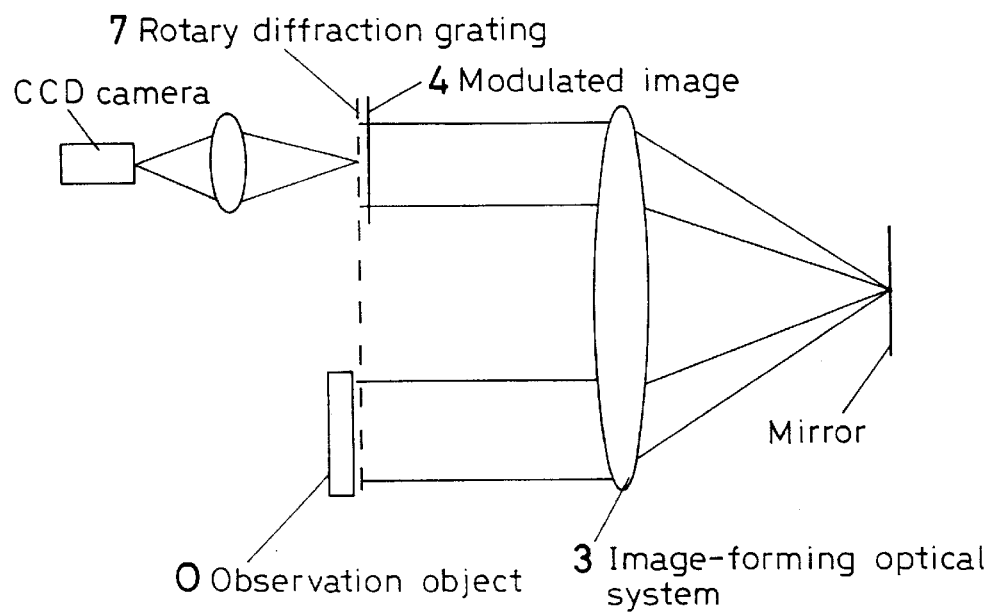
FIG. 20 is a diagram for describing an optical system for carrying out another conventional superresolution method.

As shown in FIG. 18(a), the image-forming optical system 3 in this embodiment can transfer information only in the spatial frequency region of −f$_{cutoff}$<f<f$_{cutoff}$. On the other hand, the period L of the spatial modulation by the excitation light in this embodiment is set at L=1.84/f$_{cutoff}$ because the refractive index of the cellular tissue as the observation object O can be substantially approximated by the refractive index of water. Accordingly, as shown in FIG. 18(b), the restored image I$_r$(x), which is obtained by adding together all the demodulated image components restored, is equal to an observation image formed by an image-forming system having a cutoff-frequency larger than the transfer function of the image-forming optical system 3, and exhibits superresolution. Because the frequency characteristics are depressed at an intermediate frequency region, it is desirable to correct the frequency characteristics by using appropriate spatial frequency filtering.

In this embodiment, illuminating light is applied to the observation object O from the sides thereof. Therefore, a manipulator or the like can be placed for the observation object O with minimal spatial restrictions. In addition, because the illuminating light does not pass through the image-forming optical system, it is possible to avoid deterioration of the image due to spontaneous fluorescence in the optical system.

Although in the foregoing description a dry objective 1 is used, the present invention is not necessarily limited thereto. An oil immersion objective or a water immersion objective can also be used.

Although the image-forming method and image-forming apparatus according to the present invention have been described above with regard to the principles and embodiments thereof, it should be noted that the present invention is not necessarily limited to the foregoing embodiments but can be modified in a variety of ways.

As will be clear from the foregoing description, the use of the image-forming method and image-forming apparatus according to the present invention makes it possible to realize microscopy capable of obtaining superresolution with a simple system arrangement. In addition, the use of the image-forming method according to the present invention makes it possible to realize a fringe projection superresolution light-cut microscopy that provides a natural cut image and enables real-time observation.

What we claim is:

1. An image-forming method comprising:
   a component separating; and
   a component demodulating,
   said component separating using a plurality of modulated images of an observation object that are formed by subjecting said observation object to spatial modulation;
   wherein said spatial modulation includes a plurality of modulation components, said plurality of modulated images being formed by subjecting said observation object to spatial modulation processes using modulation components of different component ratios,
   said component separating including a linear computation to separate modulated image components from said modulated images,
   wherein said linear computation uses a number of said modulated images that is not less than a number of said modulation components,
   said component demodulating demodulates each of said modulated image components to obtain a restored image.

2. An image-forming method comprising:
   modulated image forming,
   component separating, and
   component demodulating,
   said modulated image forming including:
   subjecting an observation object to spatial modulation;
   forming a plurality of modulated images of said observation object subjected to the spatial modulation; and
   imaging said modulated images;
   wherein said spatial modulation includes a plurality of modulation components,
   said plurality of modulated images being formed by subjecting said observation object to spatial modulation processes using modulation components of different component ratios,
   said component separating including a linear computation of separating modulated image components from said modulated images,
   wherein said linear computation uses a number of said modulated images that is not less than a number of said modulation components,
   said component demodulating demodulates each of said modulated image components to obtain a restored image.

3. An image-forming method according to claim 2, wherein said spatial modulation includes an exponential function type modulation component that multiplies said shape information light by an exponential function type modulation coefficient in the form of $\exp(2\pi f_0 x + j\phi)$ where j is a unit complex number $\sqrt{(-1)}$, $f_0$ is a constant representing a spatial frequency, x is a position coordinate on said observation object, and $\phi$ is a phase constant.

4. An image-forming method according to claim 2, wherein said spatial modulation includes a sinusoidal wave type modulation component in the form of $\cos(2\pi f_0 x + \phi)$ where $f_0$ is a constant representing a spatial frequency, x is a position coordinate on said observation object, and $\phi$ is a phase constant.

5. An image-forming method according to claim 3, wherein said modulated image forming step includes the step of forming a plurality of said modulated images that are different in said phase constant $\phi$.

6. An image-forming method according to claim 4, wherein said modulated image forming step includes the step of forming a plurality of said modulated images that are different in said phase constant $\phi$.

7. An image-forming method according to claim 2, wherein said component demodulating includes:
   multiplying said modulated image components by demodulation coefficients, respectively, to form demodulated image components; and
   adding together said demodulated image components to form said restored image.

8. An image-forming method according to claim 6, wherein said spatial modulation is performed by a diffraction grating placed in contact with said observation object.

9. An image-forming method according to claim 6, wherein said spatial modulation is performed by using illuminating light that illuminates said observation object.

10. An image-forming apparatus, comprising:
    an image storage unit constructed and arranged to store a plurality of modulated images; and
    an arithmetic unit constructed and arranged to execute a component separating and a component demodulating;
    said component separating using a plurality of modulated images of an observation object that are formed by subjecting said observation object to spatial modulation,
    wherein said spatial modulation includes a plurality of modulation components, said plurality of modulated images being formed by subjecting said observation object to spatial modulation processes using modulation components of different component ratios,
    said component separating including a linear computation of separating modulated image components from said modulated images, wherein said linear computation uses a number of said modulated images that is not less than a number of said modulation components, said component demodulating demodulates each of said modulated image components to obtain a restored image.

11. An image-forming apparatus, comprising:

a modulated image forming mechanism;

an image storage unit constructed and arranged to store a plurality of modulated images; and an arithmetic unit constructed and arranged to execute a component separating and a component demodulating, said modulated image forming mechanism including, a modulating member constructed and arranged to subject an observation object to spatial modulation, an image-forming optical system constructed and arranged to form a plurality of modulated images of said observation object subjected to the spatial modulation, and an image-pickup device constructed and arranged to image said modulated images, wherein said spatial modulation includes a plurality of modulation components, said plurality of modulated images being formed by subjecting said observation object to spatial modulation processes using modulation components of different component ratios, said component separating including a linear computation of separating modulated image components from said modulated images, wherein said linear computation uses a number of said modulated images that is not less than a number of said modulation components, and said component demodulating demodulates each of said modulated image components to obtain a restored image.

12. An image-forming apparatus according to claim 11, wherein said spatial modulation device includes means for forming an exponential function type modulation component that multiplies said shape information light by an exponential function type modulation coefficient in the form of $\exp(j2\pi f_0 x + j\phi)$.

13. An image-forming apparatus according to claim 11, wherein said spatial modulation includes a sinusoidal wave type modulation component in the form of $\cos(2\pi f_0 x + \phi)$.

14. An image-forming apparatus according to claim 12, wherein said spatial modulation device includes means forming a plurality of said spatial modulation component that are different in said phase constant $\phi$.

15. An image-forming apparatus according to claim 13, wherein said spatial modulation device includes means for forming a plurality of said spatial modulation components that are different in said phase constant $\phi$.

16. An image-forming apparatus according to claim 12, wherein said component demodulating includes:

multiplying said modulated image components by demodulation coefficients, respectively, to form demodulated image components; and adding together said demodulated image components to form said restored image.

17. An image-forming apparatus according to claim 15, wherein said modulating member includes a diffraction grating placed in contact with said observation object.

18. An image-forming apparatus according to claim 15, wherein said modulating member includes means for spatially modulating illuminating light that illuminates said observation object.

19. An image-forming apparatus according to claim 18, wherein said modulating member includes means for spatially modulating said illuminating light by projecting a pattern onto said observation object.

20. An image-forming apparatus according to claim 18, wherein said modulating member includes means for forming interference fringes by coherent light emitted from a coherent light source.

* * * * *

(12) EX PARTE REEXAMINATION CERTIFICATE (10683rd)
United States Patent
Hayashi et al.

(10) Number: US 6,239,909 C1
(45) Certificate Issued: Aug. 14, 2015

(54) IMAGE-FORMING METHOD AND IMAGE-FORMING APPARATUS

(75) Inventors: Shinichi Hayashi, Toshima-ku (JP); Yasuhiro Kamihara, Hino (JP)

(73) Assignee: OLYMPUS OPTICAL CO., LTD., Shibuya-Ku, Tokyo (JP)

Reexamination Request:
No. 90/013,126, Jan. 23, 2014

Reexamination Certificate for:
Patent No.: 6,239,909
Issued: May 29, 2001
Appl. No.: 09/219,605
Filed: Dec. 23, 1998

(30) Foreign Application Priority Data

Dec. 25, 1997 (JP) ........................................ 9-356801
Apr. 22, 1998 (JP) ..................................... 10-111644

(51) Int. Cl.
*G02B 5/18* (2006.01)
*G02B 21/00* (2006.01)
*G02B 27/58* (2006.01)
*G02B 21/06* (2006.01)

(52) U.S. Cl.
CPC ..................................... *G02B 21/06* (2013.01)

(58) Field of Classification Search
None
See application file for complete search history.

(56) References Cited

To view the complete listing of prior art documents cited during the proceeding for Reexamination Control Number 90/013,126, please refer to the USPTO's public Patent Application Information Retrieval (PAIR) system under the Display References tab.

*Primary Examiner* — Deandra Hughes

(57) ABSTRACT

A microscopy and apparatus capable of obtaining superresolution, and a fringe projection light-cut microscopy and apparatus capable of obtaining a natural light-cut image and enabling real-time observation. At the component separating step, a plurality of modulated images of an observation object (O) are formed by subjecting the observation object (O) to spatial modulation including a plurality of modulation components while varying the component ratios of the modulation components by moving a diffraction grating (21), which modulates the observation object (O), to a plurality of different positions. The modulated images are detected with an image pickup device (22). Modulated image components corresponding to the modulation components are separated from the number of modulated images that is not less than the number of the modulation components by using linear computation. At the component demodulating step, at least one of the separated modulated image components is demodulated.

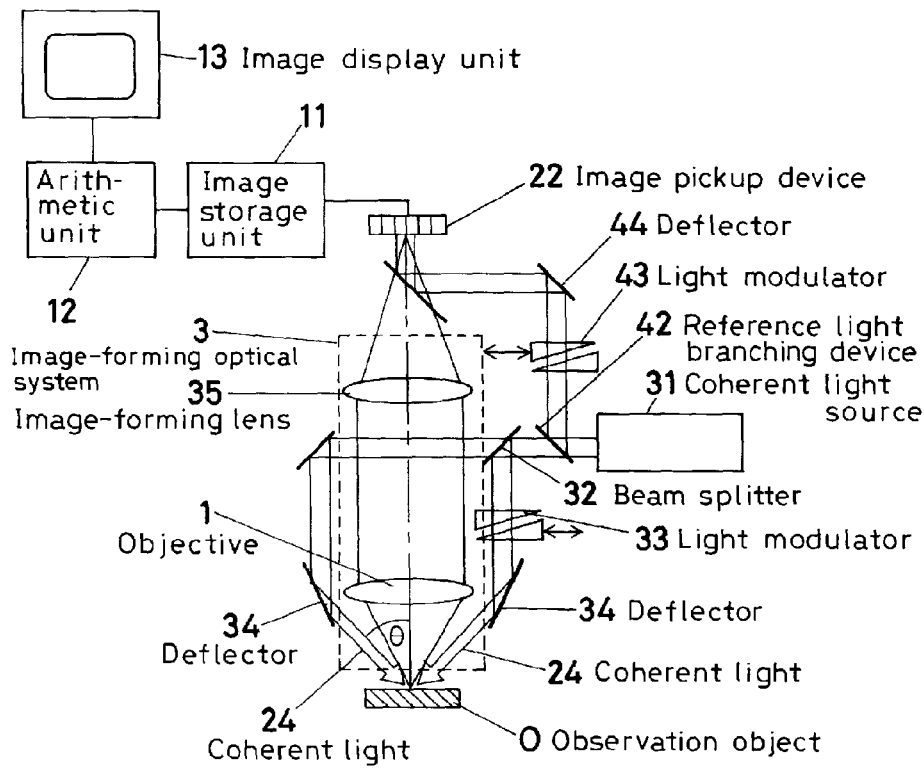

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-10 are cancelled.

Claim 11 is determined to be patentable as amended.

Claims 12-20, dependent on an amended claim, are determined to be patentable.

11. An image-forming apparatus, comprising:
a modulated image forming mechanism;
an image storage unit constructed and arranged to store a plurality of modulated images; and
an arithmetic unit constructed and arranged to execute a component separating and a component demodulating, said modulated image forming mechanism including,
a modulating member constructed and arranged to subject an observation object to spatial modulation *in a plane orthogonal to an optical axis*,
an image-forming optical system constructed and arranged to form a plurality of modulated images of said observation object subjected to the spatial modulation, and
an image-pickup device constructed and arranged to image said modulated images,
wherein said spatial modulation includes a plurality of modulation components, said plurality of modulated images being formed by subjecting said observation object to spatial modulation processes using modulation components of different component ratios,
said component separating including a linear computation of separating modulated image components from said modulated images,
wherein said linear computation uses a number of said modulated images that is not less than a number of said modulation components, and
said component demodulating demodulates each of said modulated image components to obtain a restored image.

\* \* \* \* \*

(12) SUPPLEMENTAL EXAMINATION CERTIFICATE

United States Patent  
Hayashi et al.

(10) Number: 6,239,909 F1  
(45) Certificate Issued: May 16, 2014

Control No.: 96/000,056  
Primary Examiner: Deandra M. Hughes

Filing Date: Apr. 2, 2014

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 4,621,911 | 11/1986 | Lanni et al. |

OTHER DOCUMENTS

Request for Reexamination of 6,239,909 filed Jan. 21, 2014 (Control No. 90/013,126).

Non-Final Office Action mailed Aug. 2, 2000 (Application No. 09/219,605).

Remarks and Amendments filed Dec. 1, 2000 (Application No. 09/219,605).